US012749753B2

(12) United States Patent
Ahn et al.

(10) Patent No.: US 12,749,753 B2
(45) Date of Patent: Sep. 29, 2026

(54) BATTERY PACK

(71) Applicant: SAMSUNG SDI CO., LTD., Yongin-si (KR)

(72) Inventors: Byungkook Ahn, Yongin-si (KR); Daepyo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 709 days.

(21) Appl. No.: 18/034,213

(22) PCT Filed: Nov. 2, 2021

(86) PCT No.: PCT/KR2021/015736
§ 371 (c)(1),
(2) Date: Apr. 27, 2023

(87) PCT Pub. No.: WO2022/092994
PCT Pub. Date: May 5, 2022

(65) Prior Publication Data
US 2023/0395915 A1 Dec. 7, 2023

(30) Foreign Application Priority Data
Nov. 2, 2020 (KR) ........................ 10-2020-0144581

(51) Int. Cl.
*H01M 50/213* (2021.01)
*H01M 10/42* (2006.01)
*H01M 10/48* (2006.01)

(52) U.S. Cl.
CPC ..... *H01M 50/213* (2021.01); *H01M 10/4257* (2013.01); *H01M 10/482* (2013.01)

(58) Field of Classification Search
None
See application file for complete search history.

(56) References Cited

U.S. PATENT DOCUMENTS 10,186,697 B1 * 1/2019 Harris, III ........... H01M 50/213
10,205,150 B2 2/2019 Wynn et al.
(Continued)

FOREIGN PATENT DOCUMENTS

CN 111033794 A 4/2020
CN 111063836 A 4/2020
JP 2018-77933 A 5/2018
(Continued)

OTHER PUBLICATIONS

Chinese Office Action dated Sep. 29, 2025, of the corresponding CN Patent Application No. 202180074543.6.
(Continued)

*Primary Examiner* — Scott J. Chmielecki
(74) *Attorney, Agent, or Firm* — Lee IP Law, P.C.

(57) ABSTRACT

A battery pack includes battery cells arranged along rows parallel to a first axis, the battery cells arranged in adjacent rows along a second axis crossing the first axis being misaligned with each other along the first axis; and a connection member configured to electrically connect the battery cells and form parallel modules, wherein the parallel modules include: a first parallel connection connecting first and second battery cells in adjacent rows; a second parallel connection connecting third and fourth battery cells in adjacent rows; and a third parallel connection connecting a pair of battery cells in a same row. The battery pack according to an embodiment may be advantageous for miniaturization and may provide a high-capacity output.

20 Claims, 13 Drawing Sheets

(56) References Cited

U.S. PATENT DOCUMENTS

| | | | | |
|---|---|---|---|---|
| 10,243,183 | B1 * | 3/2019 | Harris, III | H01M 50/509 |
| 10,305,078 | B1 * | 5/2019 | Harris, III | H01M 50/30 |
| 2002/0022178 | A1 | 2/2002 | Asaka et al. | |
| 2009/0297892 | A1 * | 12/2009 | Ijaz | H01M 10/643 219/121.64 |
| 2010/0062329 | A1 | 3/2010 | Muis | |
| 2015/0249278 | A1 | 9/2015 | Park et al. | |
| 2017/0256770 | A1 * | 9/2017 | Wynn | H01M 50/213 |
| 2018/0261823 | A1 | 9/2018 | Jan et al. | |
| 2019/0131672 | A1 | 5/2019 | Stafl et al. | |
| 2019/0181400 | A1 | 6/2019 | Nakasawa et al. | |
| 2020/0176735 | A1 | 6/2020 | Muratsu et al. | |
| 2020/0227708 | A1 | 7/2020 | Ahn et al. | |
| 2022/0140454 | A1 * | 5/2022 | Ahn | H01M 10/613 429/7 |
| 2023/0207925 | A1 | 6/2023 | Lee et al. | |
| 2023/0253646 | A1 * | 8/2023 | Tushar | H01M 10/6551 429/72 |
| 2024/0322350 | A1 | 9/2024 | Muratsu et al. | |

FOREIGN PATENT DOCUMENTS

| | | | | |
|---|---|---|---|---|
| JP | 2018-116775 A | | 7/2018 | |
| KR | 10-2020-0094715 A | | 8/2020 | |
| KR | 20220059234 A | * | 5/2022 | H01M 50/503 |
| WO | WO 2018/003468 A1 | | 1/2018 | |
| WO | WO-2022092994 A1 | * | 5/2022 | H01M 50/512 |

OTHER PUBLICATIONS

European Search Report dated Sep. 17, 2024, of the corresponding EP Patent Application No. 21886986.5.

International Search Report dated Feb. 9, 2022 for PCT/KR2021/015736.

* cited by examiner

[Fig. 1]
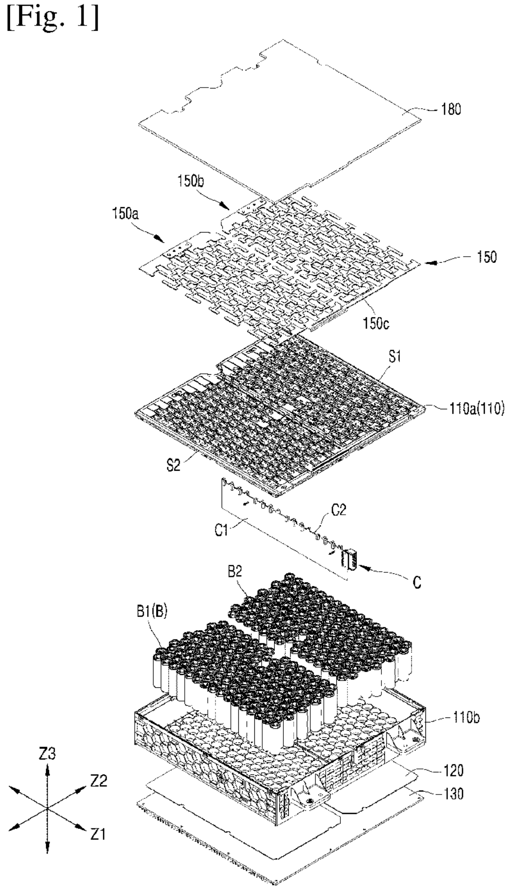

[Fig. 2]
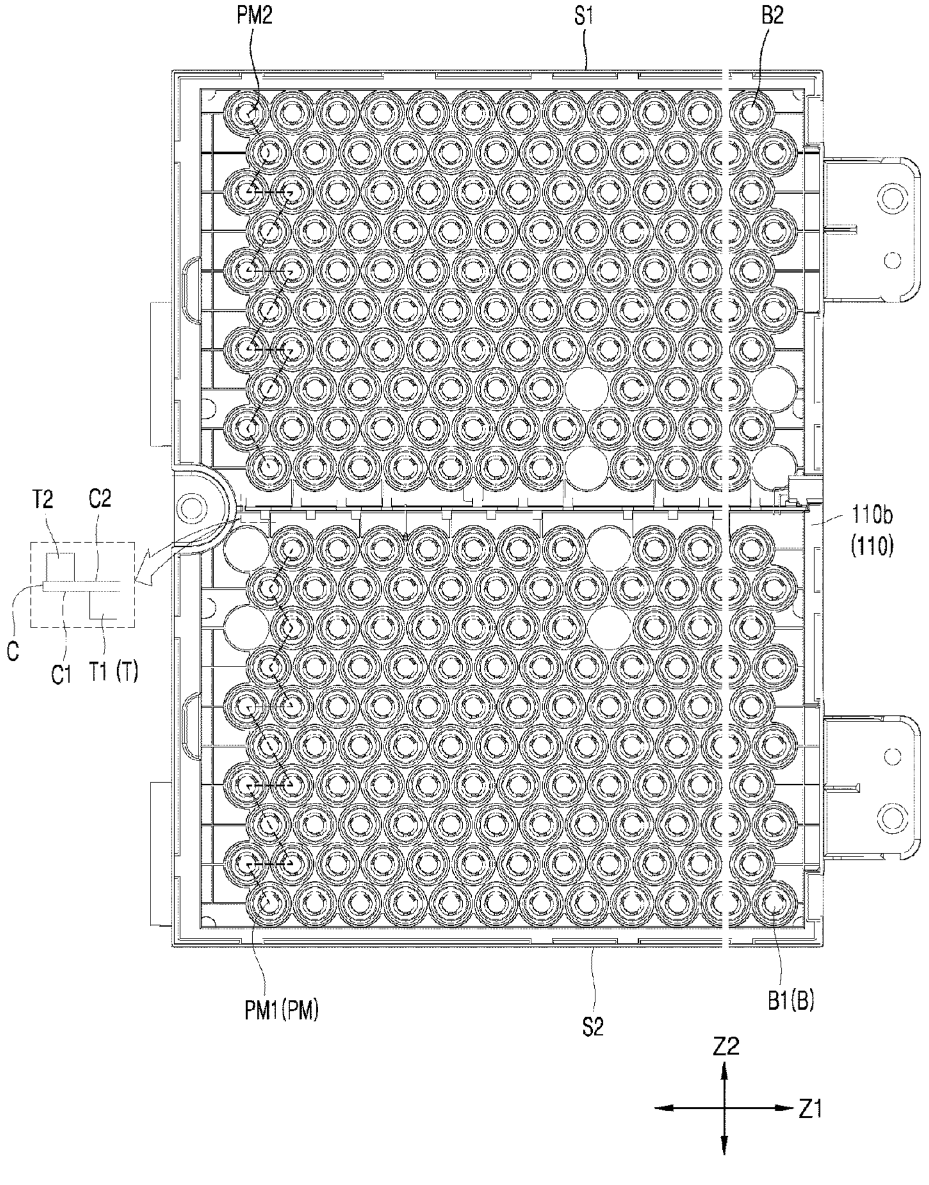

[Fig. 3]
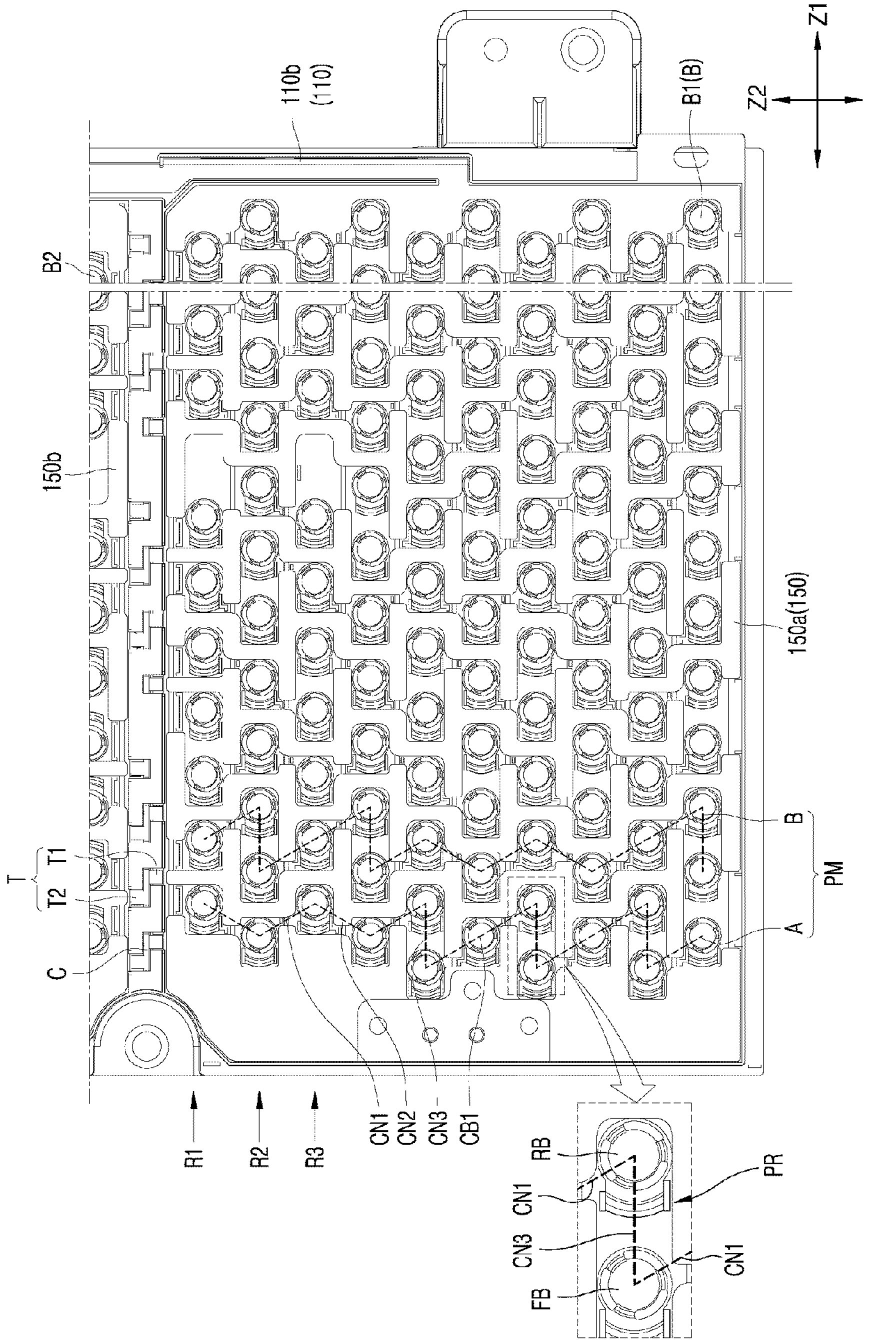

[Fig. 4]
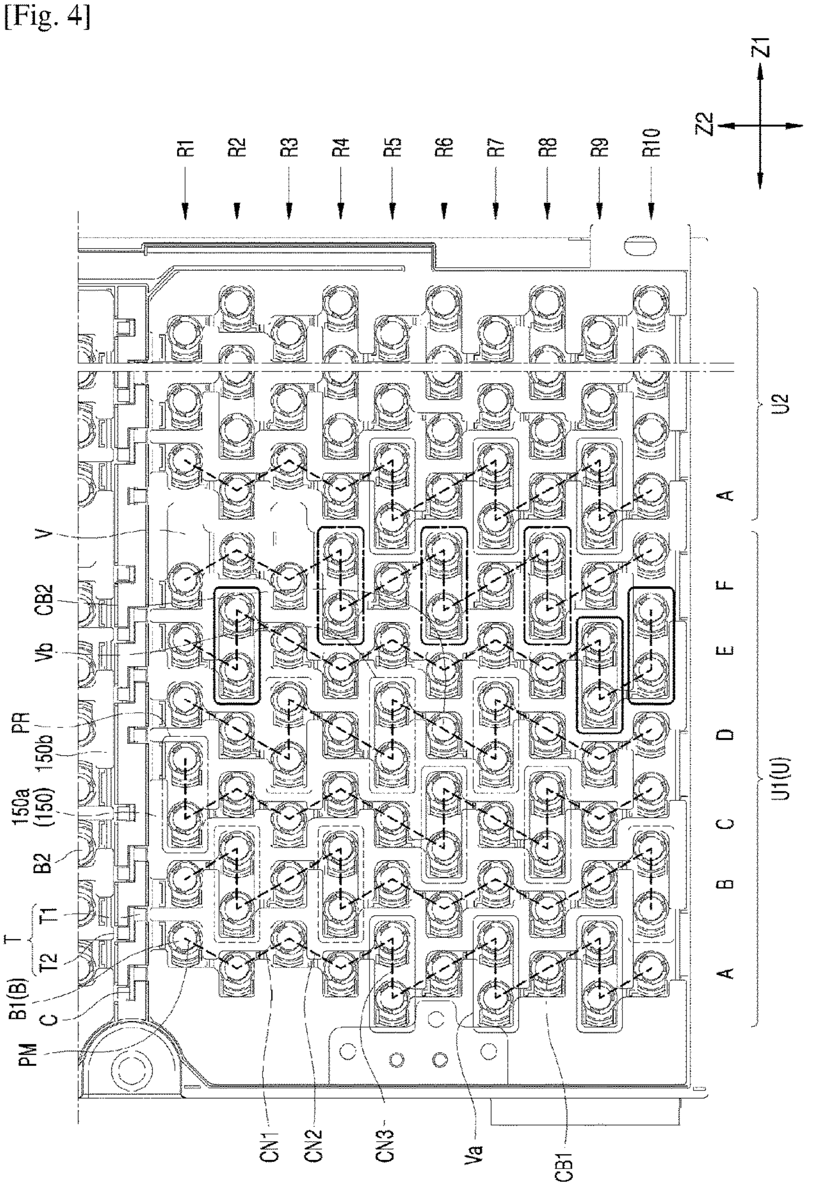
[Fig. 5A]
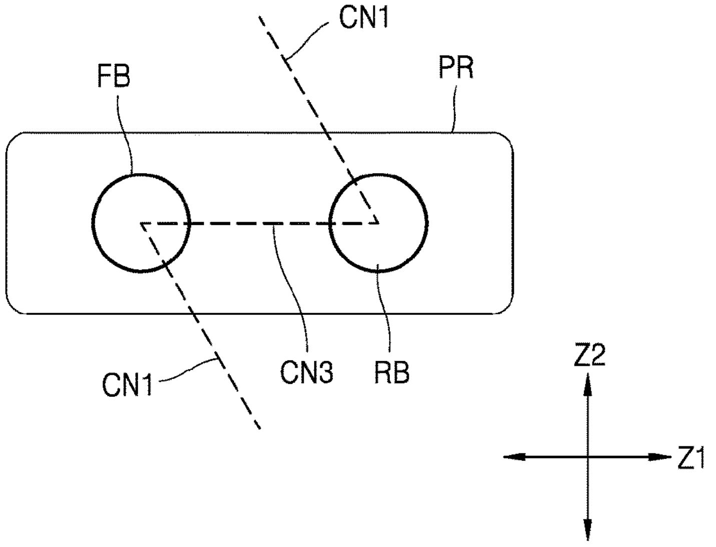

[Fig. 5B]
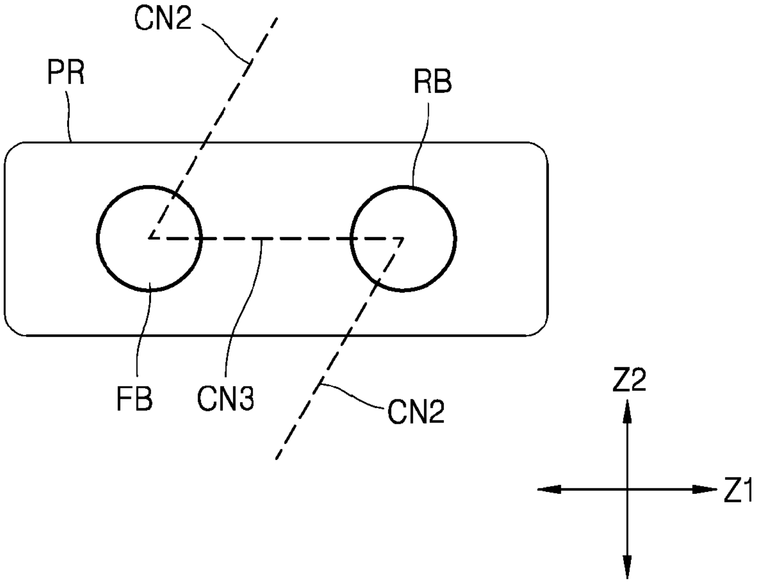
[Fig. 6A]
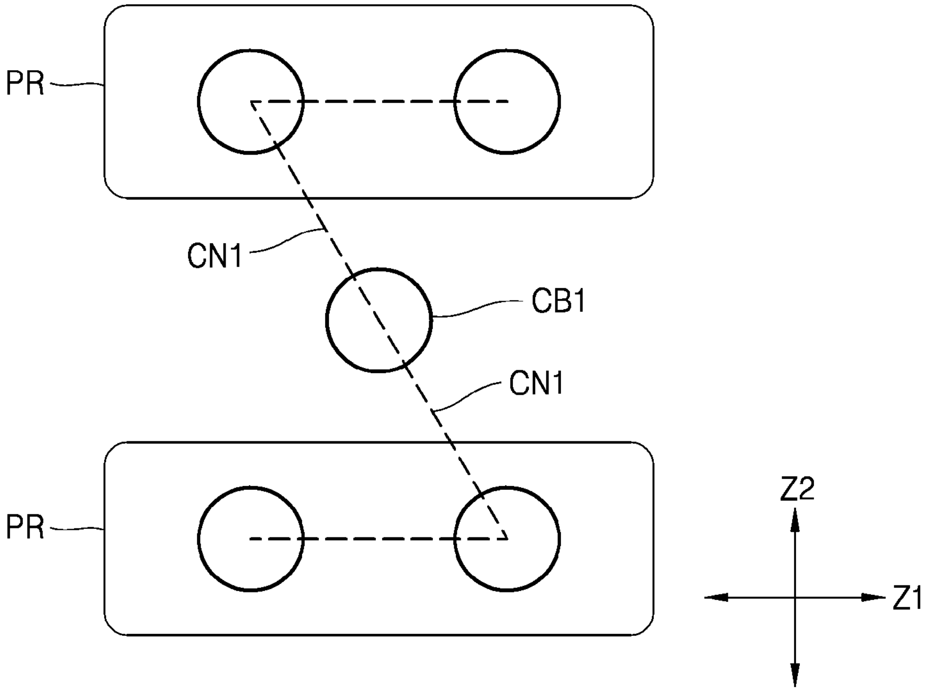

[Fig. 6B]
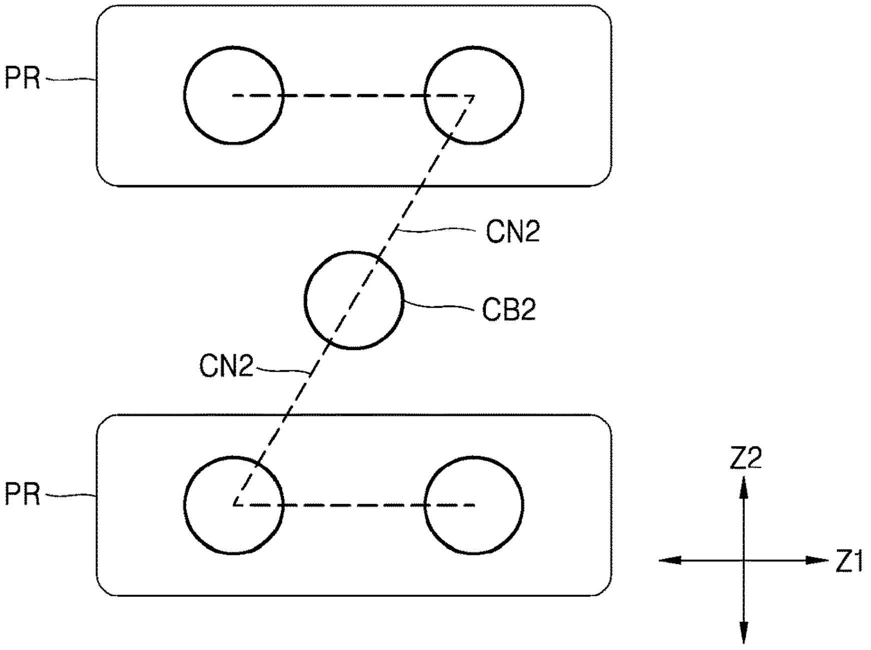
[Fig. 7]
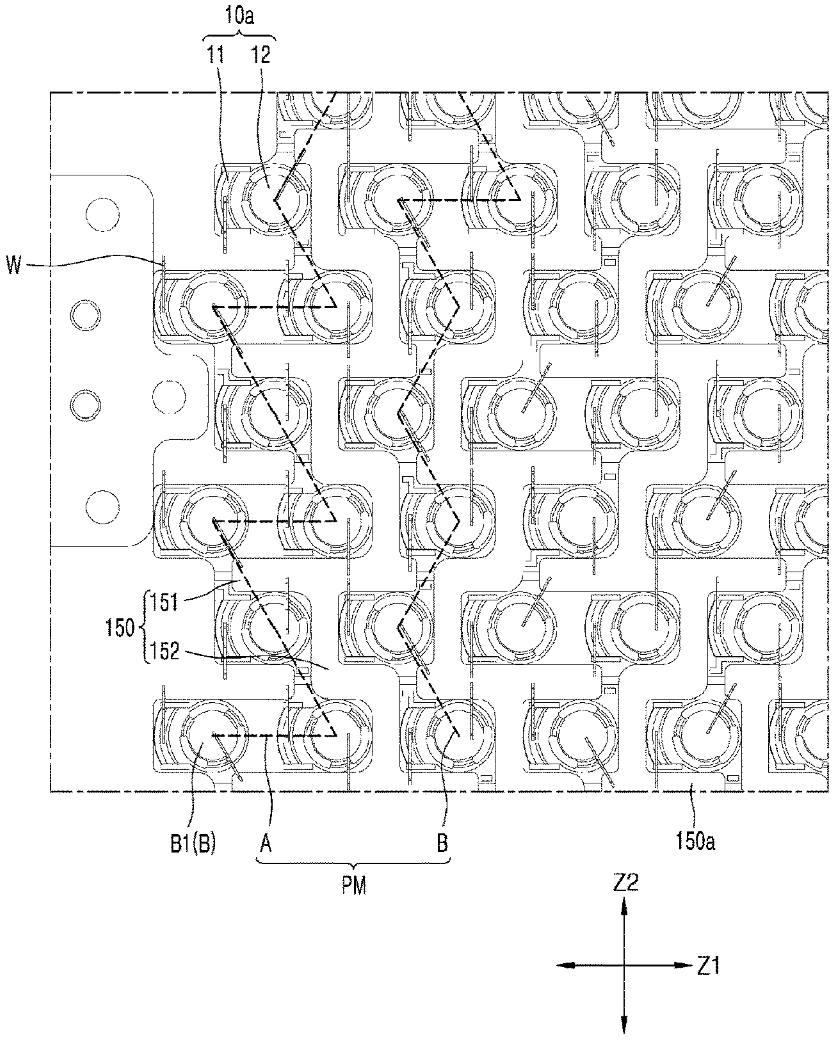

[Fig. 8]
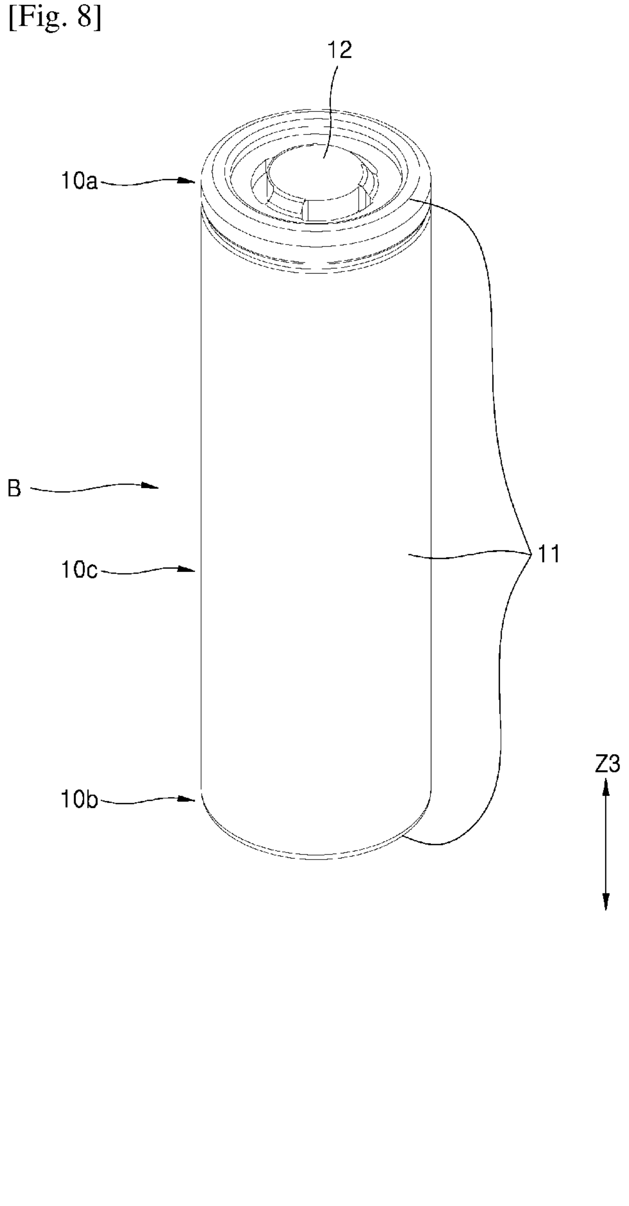

[Fig. 9]
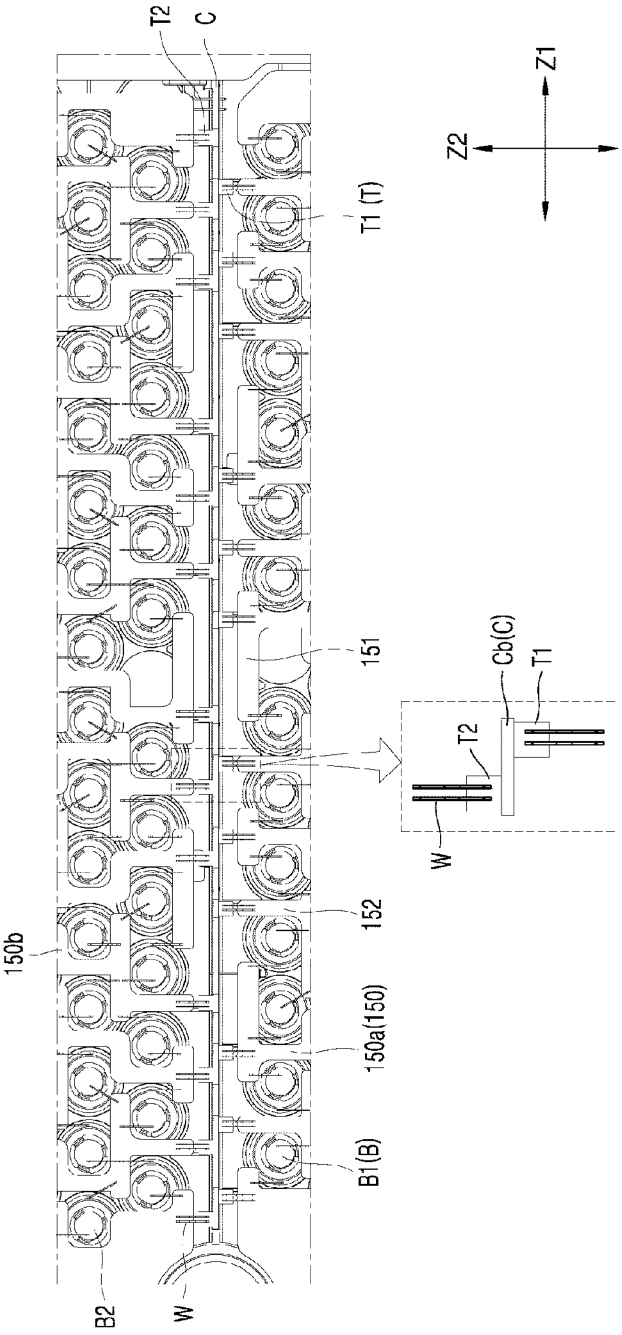

[Fig. 10]
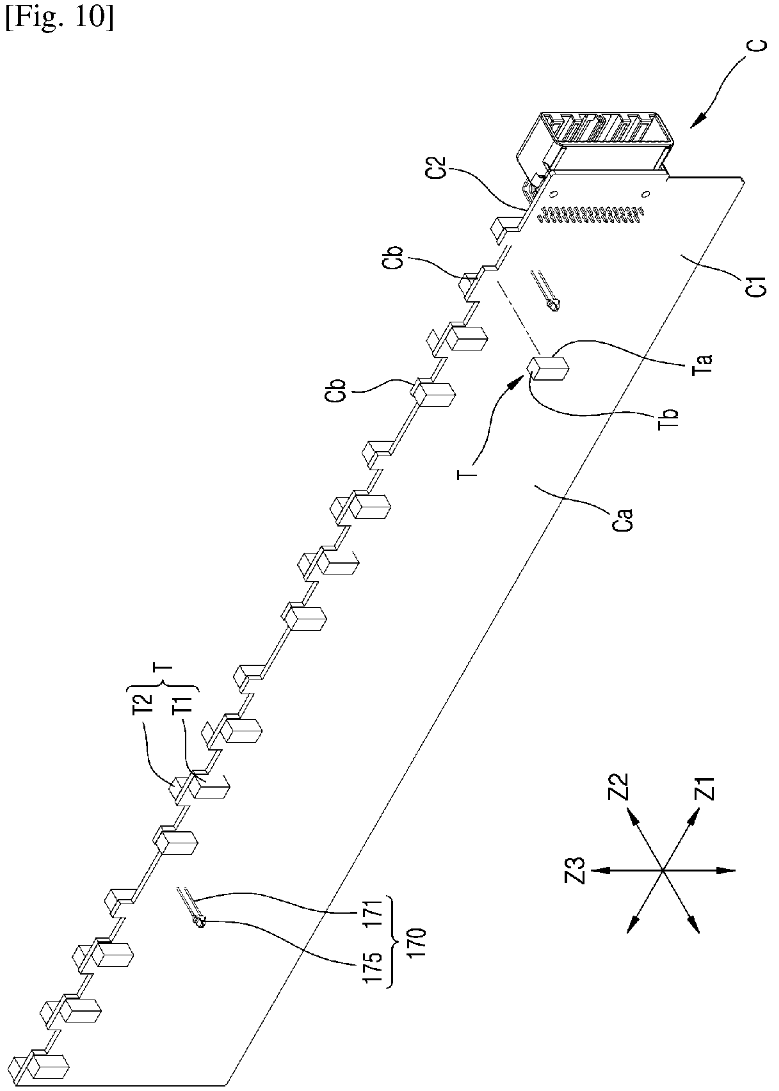

[Fig. 11]
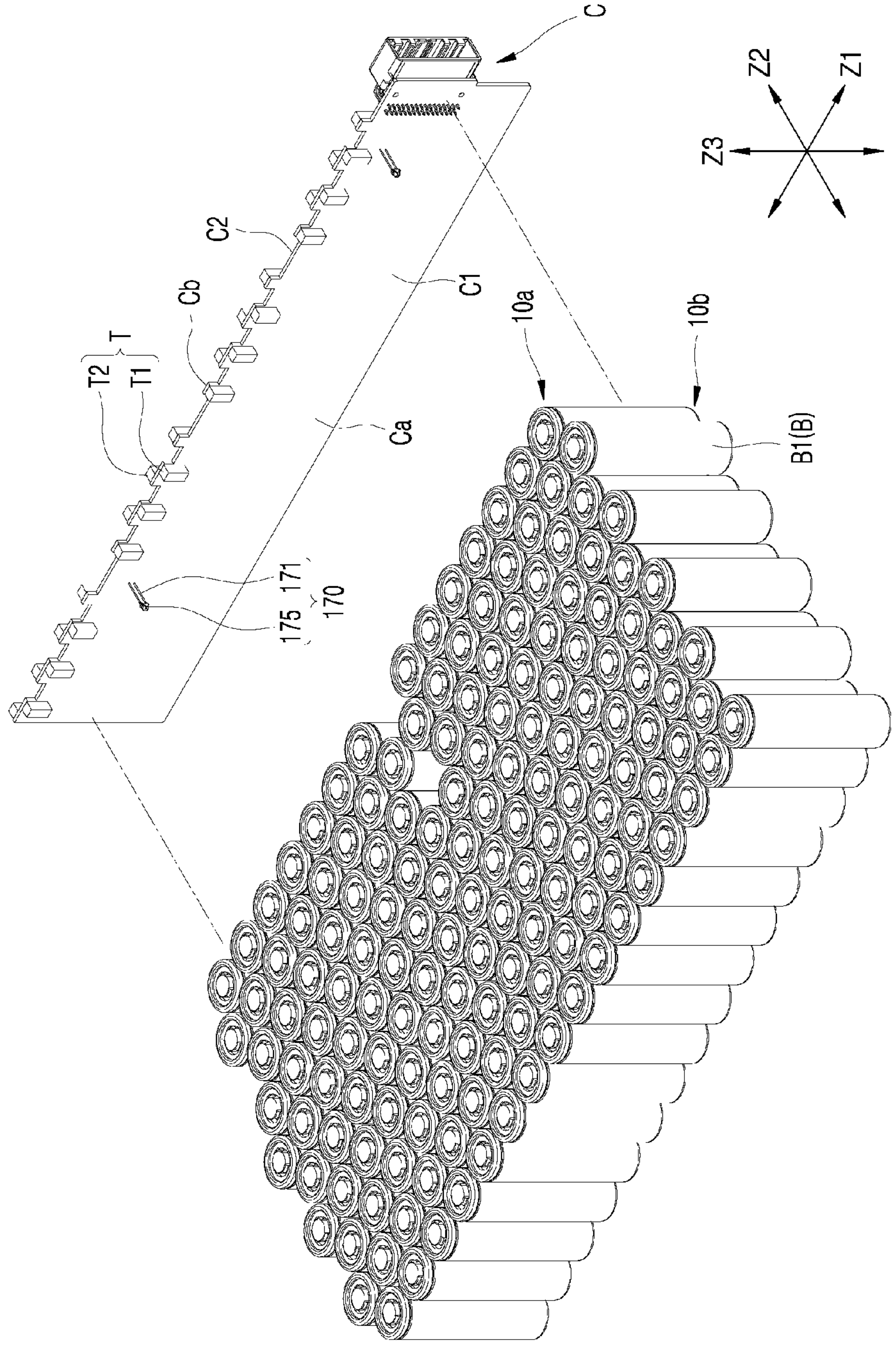

[Fig. 12]
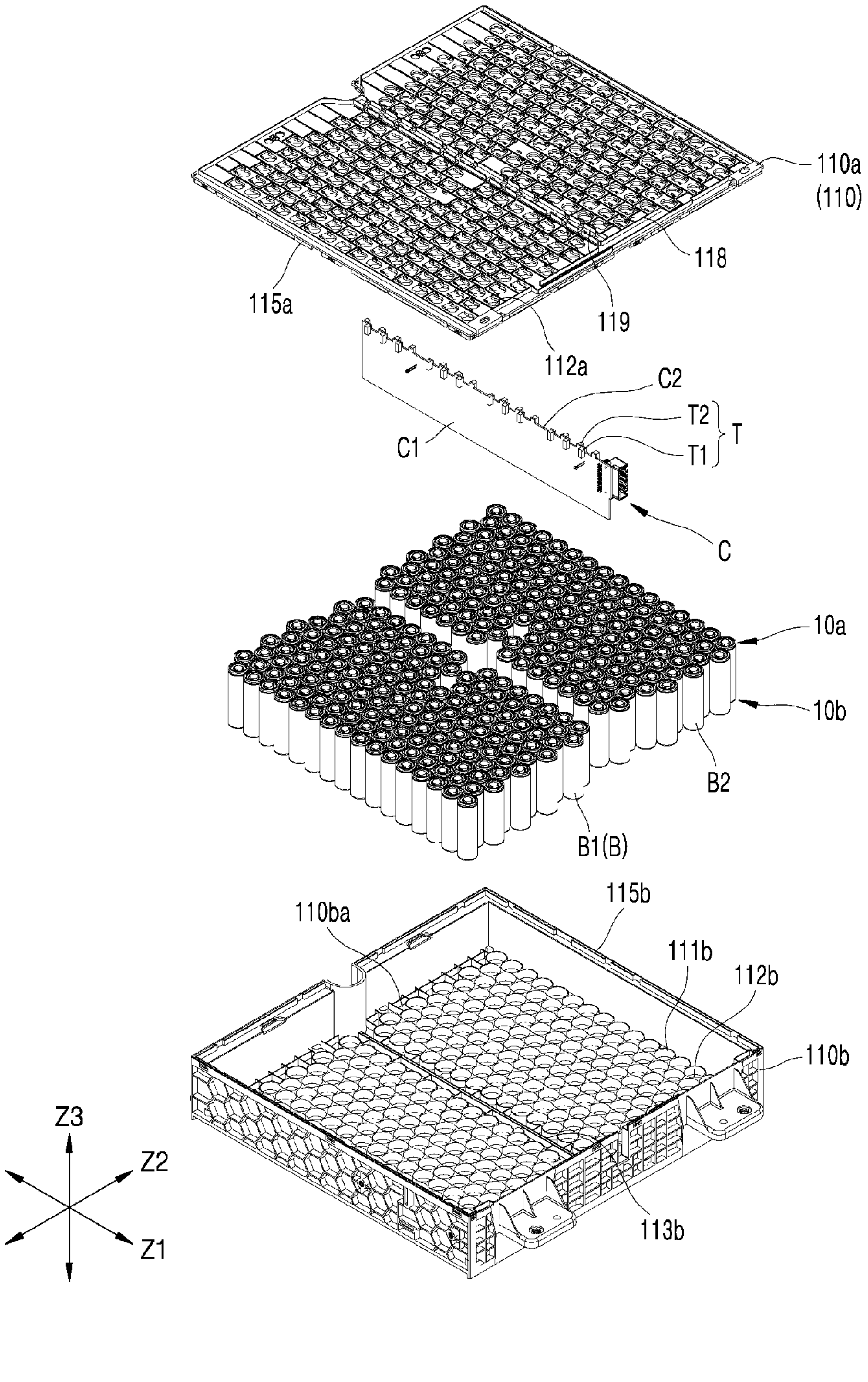

[Fig. 13]
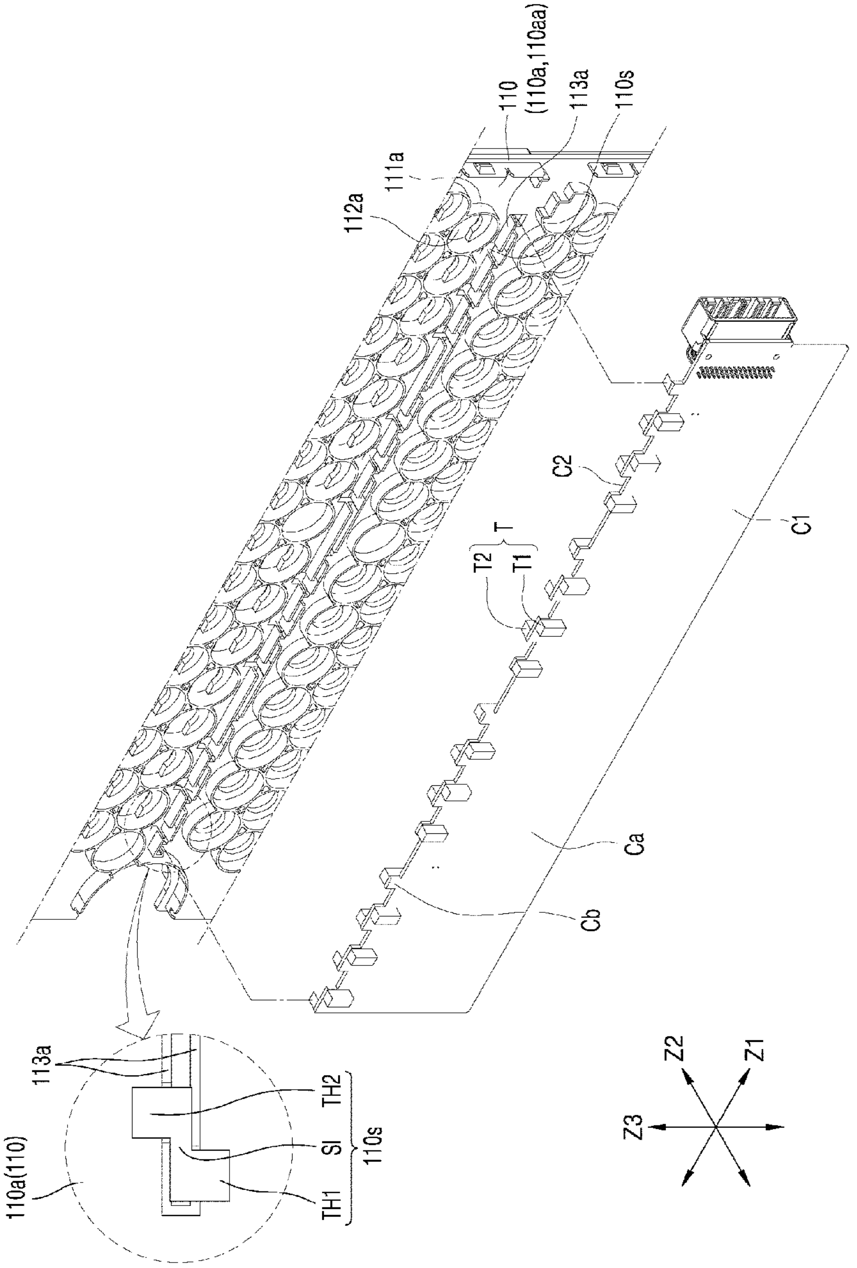

[Fig. 14]
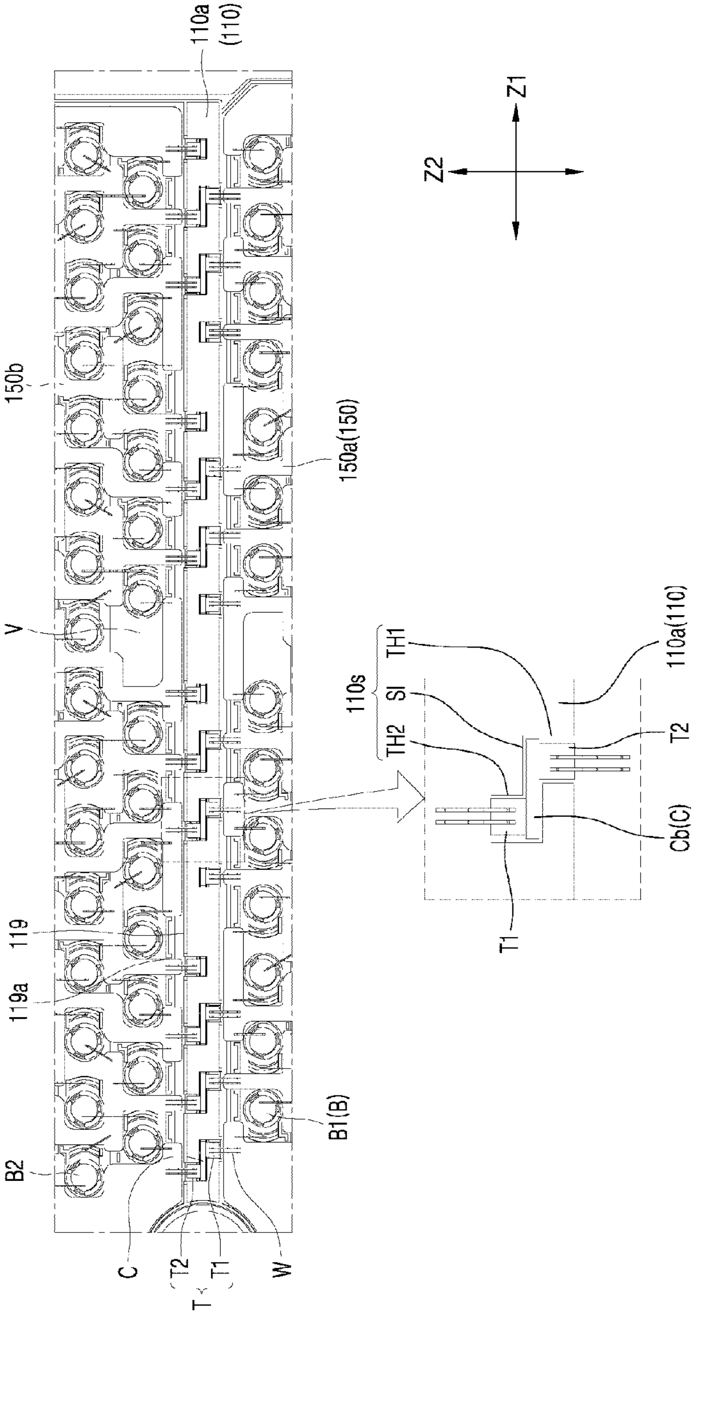

BATTERY PACK

CROSS REFERENCE TO RELATED APPLICATIONS

This is the U.S. national phase application based on PCT/KR2021/015736, filed Nov. 2, 2021, which is based on Korean Patent Application No. 10-2020-0144581, filed Nov. 2, 2020, the entire contents of all of which are hereby incorporated by reference.

TECHNICAL FIELD

One or more embodiments relate to battery packs.

BACKGROUND ART

Typically, unlike primary batteries that are unable to charge, secondary batteries are capable of charging and discharging. Secondary batteries are used as energy sources for mobile devices, electric vehicles, hybrid vehicles, electric bicycles, uninterruptible power supply, and the like. Secondary batteries may be used in the form of a single battery or a module by connecting a plurality of cells into one unit, depending on the type of an external device to be applied.

DISCLOSURE

Technical Problem

One or more embodiments include battery packs which may be advantageous for miniaturization and provide a high-capacity output.

Additional aspects will be set forth in part in the description which follows and, in part, will be apparent from the description, or may be learned by practice of the presented embodiments of the disclosure.

Technical Solution

According to one or more embodiments, a battery pack includes a series of battery cells arranged along a series of rows parallel to a first axis, the battery cells arranged in adjacent rows along a second axis crossing the first axis being misaligned with each other along the first axis, and a connection member configured to electrically connect the series of battery cells and form a series of parallel modules. The series of parallel modules include a first parallel connection connecting a first battery cell at a front position to a second battery cell at a rear position along the first axis, the first battery cell and the second battery cell being in adjacent rows along the second axis, a second parallel connection connecting a third battery cell at the rear position to a fourth battery cell at the front position along the first axis, the first battery cell and the fourth battery cell being in adjacent rows along the second axis, and a third parallel connection connecting a pair of battery cells of the series of battery cells in a same row of the series of rows.

For example, the first parallel connection and the second parallel connection may be misaligned with each other.

For example, the first parallel connection is oriented in a direction inclined in a clockwise direction and the second parallel connection is oriented in a direction inclined in a counterclockwise direction opposite to the clockwise direction with respect to the second axis.

For example, the first parallel connection and the second parallel connection may each be formed in a direction inclined at an acute angle with respect to the second axis.

For example, the third parallel connection may be parallel to the first axis.

For example, the pair of battery cells may include a front specific cell and a rear specific cell connected by the third parallel connection in which the front specific cell and the rear specific cell belong to a particular row selected from among the series of rows.

For example, the front specific cell may be further connected to the second parallel connection or the first parallel connection.

For example, the rear specific cell may be further connected to the first parallel connection or the second parallel connection.

For example, in a row that does not belong to the particular row, a battery cell of the plurality of battery cells is connected by the first and second parallel connections.

For example, in the series of battery cells, a first position correction cell may form the first parallel connection with each of a preceding row and a subsequent row.

For example, the first position correction cell may be arranged between a first, third parallel connection and a second, third parallel connection.

For example, in the series of battery cells, a second position correction cell may form the second parallel connection with each of a preceding row and a subsequent row.

For example, the second position correction cell may be arranged between a first, third parallel connection and a second, third parallel connection.

For example, the series of parallel modules may include at least two third parallel connections in different rows among the series of rows.

For example, the third parallel connection may include a series of third parallel connections, and in a first parallel module and a second parallel module adjacent to the first parallel module among the series of parallel modules, the series of third parallel connections do not to overlap each other.

For example, the battery pack may further include a series of battery units repeatedly arranged along the first axis and the series of parallel modules neighboring each other include the third parallel connection in rows different from each other.

For example, each battery unit of the series of battery units may include the series of parallel modules.

For example, two parallel modules arbitrarily selected from among the series of parallel modules may form the third parallel connection in at least one row different from each other.

For example, a void position that is not filled with any of the series of battery cells may be at a boundary area between one battery unit and another battery unit along the first axis.

For example, the number of battery cells in a parallel module of the series of parallel modules may be greater than the number of rows included in the parallel module.

For example, a parallel module of the series of parallel modules may include n-number of battery cells connected in parallel to each other, and m-number of rows, and the number of particular rows forming the third parallel connection in the parallel module may be n−m.

Advantageous Effects

The battery pack according to an embodiment may be advantageous for miniaturization and may provide a high-capacity output.

DESCRIPTION OF DRAWINGS

The above and other aspects, features, and advantages of certain embodiments of the disclosure will be more apparent from the following description taken in conjunction with the accompanying drawings, in which:

FIG. 1 is an exploded perspective view of a battery pack according to an embodiment;

FIG. 2 is a plan view showing an arrangement of battery cells of FIG. 1;

FIGS. 3 and 4 are plan views showing a connection between battery cells of FIG. 2;

FIGS. 5A and 5B are diagrams respectively showing connections between battery cells in regions Va and Vb of FIG. 4;

FIGS. 6A and 6B are diagrams respectively showing connections between first and second position correction cells of FIG. 4;

FIG. 7 is a view showing a connection member for connecting the battery cell and a busbar of FIG. 4;

FIG. 8 is a perspective view of the battery cell of FIG. 4;

FIG. 9 is a view showing a connection of a circuit board of FIG. 3;

FIG. 10 is a perspective view of the circuit board of FIG. 9;

FIG. 11 is a perspective view showing a mounting structure of a thermistor for obtaining temperature information of a battery cell;

FIG. 12 is an exploded perspective view showing an assembly of a cell holder and the battery cell of FIG. 1;

FIG. 13 is an exploded perspective view showing an assembly of the cell holder and the circuit board of FIG. 12; and FIG. 14 is a view for explaining a sensing hole of the cell holder.

BEST MODE

According to one or more embodiments, a battery pack includes a series of battery cells arranged along a series of rows parallel to a first axis, the battery cells arranged in adjacent rows along a second axis crossing the first axis being misaligned with each other along the first axis, and

- a connection member configured to electrically connect the series of battery cells and form a series of parallel modules. The series of parallel modules include
- a first parallel connection connecting a first battery cell at a front position to a second battery cell at a rear position along the first axis, the first battery cell and the second battery cell being in adjacent rows along the second axis, a second parallel connection connecting a third battery cell at the rear position to a fourth battery cell at the front position along the first axis, the first battery cell and the fourth battery cell being in adjacent rows along the second axis, and a third parallel connection connecting a pair of battery cells of the series of battery cells in a same row of the series of rows.

For example, the first parallel connection and the second parallel connection may be misaligned with each other.

For example, the first parallel connection is oriented in a direction inclined in a clockwise direction and the second parallel connection is oriented in a direction inclined in a counterclockwise direction opposite to the clockwise direction with respect to the second axis.

For example, the first parallel connection and the second parallel connection may each be formed in a direction inclined at an acute angle with respect to the second axis.

For example, the third parallel connection may be parallel to the first axis.

For example, the pair of battery cells may include a front specific cell and a rear specific cell connected by the third parallel connection in which the front specific cell and the rear specific cell belong to a particular row selected from among the series of rows.

For example, the front specific cell may be further connected to the second parallel connection or the first parallel connection.

For example, the rear specific cell may be further connected to the first parallel connection or the second parallel connection.

For example, in a row that does not belong to the particular row, a battery cell of the plurality of battery cells is connected by the first and second parallel connections.

For example, in the series of battery cells, a first position correction cell may form the first parallel connection with each of a preceding row and a subsequent row.

For example, the first position correction cell may be arranged between a first, third parallel connection and a second, third parallel connection.

For example, in the series of battery cells, a second position correction cell may form the second parallel connection with each of a preceding row and a subsequent row.

For example, the second position correction cell may be arranged between a first, third parallel connection and a second, third parallel connection.

For example, the series of parallel modules may include at least two third parallel connections in different rows among the series of rows.

For example, the third parallel connection may include a series of third parallel connections, and in a first parallel module and a second parallel module adjacent to the first parallel module among the series of parallel modules, the series of third parallel connections do not to overlap each other.

For example, the battery pack may further include a series of battery units repeatedly arranged along the first axis and the series of parallel modules neighboring each other include the third parallel connection in rows different from each other.

For example, each battery unit of the series of battery units may include the series of parallel modules.

For example, two parallel modules arbitrarily selected from among the series of parallel modules may form the third parallel connection in at least one row different from each other.

For example, a void position that is not filled with any of the series of battery cells may be at a boundary area between one battery unit and another battery unit along the first axis.

For example, the number of battery cells in a parallel module of the series of parallel modules may be greater than the number of rows included in the parallel module.

For example, a parallel module of the series of parallel modules may include n-number of battery cells connected in parallel to each other, and m-number of rows, and the number of particular rows forming the third parallel connection in the parallel module may be n−m.

MODE FOR INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A battery pack according to an embodiment is described with reference to the accompanying drawings.

FIG. 1 is an exploded perspective view of a battery pack according to an embodiment. FIG. 2 is a plan view showing an arrangement of battery cells of FIG. 1. FIGS. 3 and 4 are plan views showing a connection between battery cells of FIG. 2. FIGS. 5A and 5B are diagrams respectively showing connections between battery cells in regions Va and Vb of FIG. 4. FIGS. 6A and 6B are diagrams respectively showing connections between first and second position correction cells of FIG. 4. FIG. 7 is a view showing a connection member for connecting the battery cell and a busbar of FIG. 4. FIG. 8 is a perspective view of the battery cell of FIG. 4.

Referring to FIGS. 1 to 4, a battery pack according to an embodiment may include a group of first battery cells B1, a group of second battery cells B2, and a circuit board C between the group of first battery cells B1 and the group of second battery cells B2. In an embodiment, the group of first battery cells B1 may include a plurality of first battery cells B1 arranged in rows along a first axis Z1 in which the circuit board C extends, and extending along the side of a first surface C1 of the circuit board C. Similarly, the group of second battery cells B2 may include a plurality of second battery cells B2 arranged in rows along the first axis Z1 in which the circuit board C extends, and extending along the side of a second surface C2 of the circuit board C. In this configuration, the circuit board C may include the first and second surfaces C1 and C2 opposite to each other. The first and second surfaces C1 and C2 of the circuit board C may be main surfaces that constitute the largest area of the circuit board C. The group of first battery cells B1 being arranged at the side of the first surface C1 of the circuit board C may mean that the first battery cells B1 are arranged at positions directly facing the first surface C1 of the first and second surfaces C1 and C2 of the circuit board C. Similarly, the group of second battery cells B2 being arranged at the side of the second surface C2 of the circuit board C may mean that the second battery cells B2 are arranged at positions directly facing the second surface C2 of the first and second surfaces C1 and C2 of the circuit board C. In other words, the first and second battery cells B1 and B2 may be arranged at opposite sides of the circuit board C with the circuit board C therebetween.

As such, the first and second battery cells B1 and B2 may be arranged at the opposite sides with respect to the circuit board C and may have substantially the same or similar arrangement structure or configuration. The first and second battery cells B1 and B2 may have substantially the same or similar electrical connection structure. In the descriptions below, a battery cell B may refer to any one battery cell of the first battery cells B1 or the second battery cells B2 or may be used as a collective referring to all of the first and second battery cells B1 and B2.

In an embodiment, although the battery cell B may include the first and second battery cells B1 and B2 arranged at the opposite sides of the circuit board C, in various embodiments, the battery cell B may include only the first battery cells B1 arranged at one side of the circuit board C, not including the second battery cells B2 arranged at the other side of the circuit board C. Even in this case, the technical matter described below may be applied in substantially the same or similar manner. For example, an arrangement structure or electrical connection structure of the battery cell B described below may be applied to the battery cell B arranged in a plurality of rows, regardless of the existence of the circuit board C or the position of the circuit board C, in substantially the same or similar manner.

The battery cell B may include the battery cell B arranged in a plurality of rows forming a row along the first axis Z1. The battery cell B in each row may be arranged parallel to the first axis Z1. In this configuration, throughout the present specification, the first axis Z1 may mean a row direction of the battery cell B. A plurality of battery cells B may be arranged forming a row in a forward and backward direction along the first axis Z1. The battery cells B in adjacent rows (e.g., a preceding row and a subsequent row neighboring each other) along a second axis Z2 crossing the first axis Z1 may be arranged at positions misaligned (e.g., staggered) with each other along the first axis Z1. Throughout the present specification, in an embodiment, the second axis Z2, as a direction crossing the first axis Z1, may mean a direction perpendicular to the first axis Z1. As described below, the battery cells B may be assembled at regular positions by being inserted in a cell holder 110. In this configuration, the cell holder 110 may include the first and second side portions S1 and S2 (see FIG. 2) extending along the first axis Z1 in which the battery cells B in a row are arranged. For example, the second axis Z2 may be defined as a direction from the first side portion S1 to the second side portion S2 of the cell holder 110. In this configuration, the preceding row along the second axis Z2 may mean a row arranged relatively close (e.g., proximate) to the first side portion S1 of the cell holder 110. The subsequent row may mean a row arranged relatively close (e.g., proximate) to the second side portion S2 of the cell holder 110. In an embodiment, the second axis Z2 may be defined as a direction opposite to the above-defined direction. The technical matter described below may be substantially the same as or similar to the above description, within a limitation of setting of an arrangement relationship of the preceding row and the subsequent row based on the definition according to the second axis Z2.

For example, in the battery cells B in first and second rows R1 and R2 (see FIG. 3) neighboring each other (e.g., adjacent to each other), the battery cells B in the first and second rows R1 and R2 may be arranged to be misaligned with each other toward a front position or a rear position along the first axis Z1 (e.g., the battery cells B in the first and second rows R1 and R2 may be staggered). Accordingly, the battery cells B in the first and second rows R1 and R2 may be inserted between each other and arranged densely. As such, because the battery cells B neighboring each other in the first and second rows R1 and R2 are inserted between each other, a dead space may be reduced and a compact configuration in which the battery cells B are arranged at a high density within a limited area may be available.

As the battery cells B in neighboring rows are arranged at positions alternating back and forth along the first axis Z1, the battery cells B may be arranged in a zigzag form along the second axis Z2. For example, in the battery cells B arranged neighboring one another in the first to third rows R1, R2, and R3, with respect to the battery cells B in the second row R2, the battery cells B in the first row R1 may be arranged at a position relatively biased toward the rear side, and furthermore, with respect to the battery cells B in the second row R2, the battery cells B in the third row R3 may be arranged at a position relatively biased toward the rear side (i.e., the battery cells B in the first and third rows R1 and R3 may be closer to the rear of the battery pack than the corresponding battery cells B in the second row R2). As such, as the battery cells B neighboring each other in the first to third rows R1, R2, and R3 are arranged at positions alternating back and forth, the battery cells B may be arranged in a zigzag form along the second axis Z2. As described below, as the battery cells B arranged in a zigzag form along the second axis Z2 are connected in parallel to each other, a parallel module PM may be formed. Throughout the present specification, the battery cells B being arranged zigzag along the second axis Z2 may mean that the battery cells B are not arranged in a line along the second axis Z2 (i.e., the battery cells B are not arranged parallel to the second axis Z2), but the battery cells B are arranged in a zigzag direction inclined at an acute angle to the second axis Z2.

In an embodiment, the battery cells B arranged zigzag along the second axis Z2 may be connected in parallel to each other, thereby forming one parallel module PM. The parallel modules PM neighboring each other along the first axis Z1 may be connected in series to each other. For example, in an embodiment, the battery cells B may form a series connection along the first axis Z1 and a parallel connection along the second axis Z2. The battery cells B forming a parallel connection along the second axis Z2 may mean that the battery cells B arranged zigzag along the second axis Z2 are connected in parallel, and that the battery cells B connected in parallel to each other may form a parallel connection in a direction approximately parallel to the second axis Z2.

As the battery cells B arranged zigzag along the second axis Z2 are connected in parallel, the parallel module PM may include a parallel connection between the battery cells B belonging to different rows along the second axis Z2. In an embodiment, while connecting the preceding row and the subsequent row along the second axis Z2 to each other, the parallel module PM may include a first parallel connection CN1 for connecting from the battery cell B at the front position to the battery cell B at the rear position, and a second parallel connection CN2 for connecting from the battery cell B at the rear position to the battery cell B at the front position. For example, the first parallel connection CN1 and the second parallel connection CN2 may form a parallel connection between the preceding row and the subsequent row in a direction misaligned with each other, and may be formed in a direction inclined counterclockwise and clockwise opposite to each other with respect to the second axis Z2. For example, the first and second parallel connections CN1 and CN2 may be formed in a direction inclined at an acute angle counterclockwise and clockwise opposite to each other with respect to the second axis Z2.

Throughout the present specification, the first parallel connection CN1 and the second parallel connection CN2 may be distinguished by a direction forming a parallel connection. For example, the first parallel connection CN1 may form a parallel connection from the front position toward the rear position along the second axis Z2. The second parallel connection CN2 may form a parallel direction from the rear position toward the front position along the second axis Z2.

Throughout the present specification, when the first parallel connection CN1 for connecting the preceding row and the subsequent row to each other is formed, it does not necessarily mean that the first parallel connection CN1 is formed in the same direction through the entire battery pack. In other words, the first parallel connection CN1 may be formed in a plurality of directions different from each other according to relative positions of the battery cell B in the preceding row and the battery cell B in the subsequent row, which are connected in parallel, and may include a plurality of first parallel connections CN1 formed in a plurality of directions different from each other in the entire battery pack. However, even when the first parallel connections CN1 are formed in directions different from each other, the first parallel connections CN1 may all be formed from the front position toward the rear position along the second axis Z2, and in a direction inclined in a counterclockwise direction with respect to the second axis Z2.

Similarly, throughout the present specification, when the second parallel connection CN2 connecting the preceding row and the subsequent row to each other is formed, it does not mean that the second parallel connection CN2 is necessarily formed in the same direction through the entire battery pack. In other words, the second parallel connection CN2 may be formed in a plurality of directions different from each other according to relative positions of the battery cell B in the preceding row and the battery cell B in the subsequent row, which are connected in parallel, and may include a plurality of second parallel connections CN2 formed in a plurality of directions different from each other in the entire battery pack. However, even when the second parallel connections CN2 are formed in directions different from each other, the second parallel connections CN2 may all be formed from the rear position toward the front position along the second axis Z2, and in a direction inclined in a clockwise direction with respect to the second axis Z2.

As such, the parallel module PM may include the first and second parallel connections CN1 and CN2 connecting the preceding row and the subsequent row to each other, and the parallel module PM may further include a third parallel connection CN3 for connecting the battery cells B belonging to the same row (e.g., R1, R2, or R3) to each other.

The third parallel connection CN3, unlike the first and second parallel connections CN1 and CN2, does not connect the preceding row and the subsequent row (e.g., R1 to R2) to each other, but connects the battery cells B (a front specific cell FB and a rear specific cell RB) belonging to the same row (a particular row PR). Accordingly, the third parallel connection CN3 may be formed parallel to the first axis Z1 in which the battery cells B are arranged in a row. In other words, unlike the first and second parallel connections CN1 and CN2, the third parallel connection CN3 is not formed in a direction inclined at an acute angle with respect to the second axis Z2, but may be formed along the first axis Z1. This is because the third parallel connection CN3, unlike the first and second parallel connections CN1 and CN2, does not connect the preceding row and the subsequent row along the second axis Z2, but connects the battery cells B (the front specific cell FB and the rear specific cell RB) belonging to the same row (the particular row PR) along the first axis Z1.

In the following description, for convenience of understanding, a row in which the third parallel connection CN3 is formed may be referred to as the particular row PR. The battery cell B forming the third parallel connection CN3 in the particular row PR may be referred to the front specific cell FB and the rear specific cell RB according to the position thereof. In the particular row PR, the front specific cell FB and the rear specific cell RB may form the third parallel connection CN3. In other words, the front specific cell FB and the rear specific cell RB may have a parallel connection through (via) the third parallel connection CN3.

In an embodiment, the parallel module PM may further include, in addition to the first and second parallel connections CN1 and CN2 connecting the preceding row and the subsequent row, the third parallel connection CN3 connecting the battery cells B belonging to the same row, thereby miniaturizing the size of the entire battery pack and providing a large capacity battery pack by increasing the number of the battery cells B (the first battery cell B1 or the second battery cell B2) belonging to the parallel module PM. For example, a distance between the first and second side portions S1 and S2 of the cell holder 110 corresponding to the width of the battery pack may be determined by the number of rows formed by the battery cells B (the first battery cell B1 or the second battery cell B2) forming the battery pack. In an embodiment, each of the first and second battery cells B1 and B2 may be arranged in a total of ten (10) rows.

In a comparative example contrary to the present embodiment, the parallel module PM may connect the battery cell B belonging to the preceding row and the subsequent row along the second axis Z2, and include the first and second parallel connections CN1 and CN2. Each parallel module PM may include a total of ten battery cells B (the first battery cells B1 or the second battery cells B2) including one battery cell B selected from each row. In contrast, in an embodiment, the parallel module PM may include, in addition to the first and second parallel connections CN1 and CN2 connecting the preceding row and the subsequent row, the third parallel connection CN3 connecting the battery cells B (the front specific cell FB and the rear specific cell RB) belonging to the same row (the particular row PR) to each other. The parallel module PM of the present disclosure may include thirteen battery cells B (the first battery cells B1 or the second battery cells B2) greater than the number of rows of the battery cells B (ten rows of the first battery cells B1 or the second battery cells B2). The battery pack according to the embodiment may provide a large capacity output through the parallel module PM including a large number of the battery cells B (the first battery cell B1 or the second battery cell B2) greater than the comparative example, and limit the size of the entire battery pack to a width corresponding to the battery cells B (the first battery cell B1 or the second battery cell B2) arranged in a total of ten rows as in comparative example (i.e., the battery pack of the present disclosure may have a larger output capacity than the comparative example even though the battery pack of the present disclosure and the comparative example are the same size).

In an embodiment, the number of battery cells m, for example, 13, connected in parallel to each other and included in each parallel module PM may be greater than the number n, for example, 10, of different rows included in each parallel module PM. In this configuration, when each parallel module PM includes n battery cells B, for example, 13, connected in parallel to each other and m rows, for example, 10, the number of the particular rows PR forming the third parallel connection CN3 in each parallel module PM may be n−m, for example, 3.

Referring to FIGS. 4 to 6B, in an embodiment, each parallel module PM may include the third parallel connection CN3 connecting the battery cells B (the front specific cell FB and the rear specific cell RB) belonging to the same row (the particular row PR) to each other. For example, the parallel module PM may include three third parallel connections CN3. In other words, the parallel module PM may include three instances of the particular row PR forming the third parallel connection CN3. In each particular row PR, the front specific cell FB and the rear specific cell RB may be connected in parallel to each other through (via) the third parallel connection CN3.

The front specific cell FB may be connected to the rear specific cell RB through (via) the third parallel connection CN3 and simultaneously may form the second parallel connection CN2 with the preceding row (see FIG. 5B), or the front specific cell FB may be connected to the rear specific cell RB through (via) the third parallel connection CN3 and simultaneously may form the first parallel connection CN1 with the subsequent row (see FIG. 5A). For example, in a row that is not the particular row PR, as each battery cell B is connected to the preceding row and the subsequent row and simultaneously forms the first and second parallel connections CN1 and CN2 different from each other, the front specific cell FB forming the third parallel connection CN3 may simultaneously form the first parallel connection CN1 of FIG. 5A or the second parallel connection CN2 of FIG. 5B, in addition to the third parallel connection CN3. In this configuration, according to the position of the front specific cell FB, the corresponding front specific cell FB may further form the first parallel connection CN1 (see FIG. 5A) or the second parallel connection CN2 (see FIG. 5B), in addition to the third parallel connection CN3. In other words, the front specific cell FB may simultaneously form the first and third parallel connections CN1 and CN3, or the second and third parallel connections CN2 and CN3.

Similarly, the rear specific cell RB may be connected to the front specific cell FB through (via) the third parallel connection CN3 and simultaneously may form the first parallel connection CN1 with preceding row (see FIG. 5A), or the rear specific cell RB may be connected to the front specific cell FB through the third parallel connection CN3 and simultaneously may form the second parallel connection CN2 with subsequent row (see FIG. 5B). In other words, the rear specific cell RB may simultaneously form the first and third parallel connections CN1 and CN3 (see FIG. 5A), or simultaneously form the second and third parallel connections CN2 and CN3 (see FIG. 5B).

Accordingly, in the battery pack according to an embodiment, each battery cell B may form the first and second parallel connections CN1 and CN2, the first and third parallel connections CN1 and CN3, or the second and third parallel connections CN2 and CN3. However, in an embodiment, the battery cell B may form the first parallel connection CN1 only or the second parallel connection CN2 only. For example, in an embodiment, a first position correction cell CB1 (FIG. 6A) may form the first parallel connection CN1 only, and form the first parallel connection CN1 with each of the preceding row and the subsequent row, not the second parallel connection CN2. For example, the first position correction cell CB1 (see FIG. 6A) may not form the first and second parallel connections CN1 and CN2, but may form two first parallel connections CN1 only. Similarly, a second position correction cell CB2 (see FIG. 6B) may not form the first and second parallel connections CN1 and CN2, but two second parallel connections CN2 only.

As the first and second position correction cells CB1 and CB2 form the first parallel connection CN1 only or the second parallel connection CN2 only, the center positions of different particular rows PR belonging to the same parallel module PM, for example, the center positions of three particular rows PR, may match or be aligned (or approximately match or align). When the center positions of different particular rows PR belonging to the same parallel module PM are significantly deviated from each other along the first axis Z1, a connection length between the particular rows PR different from each other may increase. A parallel connection may be biased toward the front position or the rear position along the first axis Z1. Such biased parallel connection may be accumulated along the first axis Z1, and thus, the width of the entire battery pack along the first axis Z1 may be increased.

Accordingly, in an embodiment, through the first and second position correction cells CB1 and CB2, the center positions of different particular rows PR belonging to the same parallel module PM, for example, the center positions of three particular rows PR, may be approximately matched (aligned) with one another, and thus a position deviation along the first axis Z1 may be eliminated or avoided. For example, the first and second position correction cells CB1 and CB2 may form the first parallel connection CN1 only or the second parallel connection CN2 only, and form a parallel connection direction to be biased toward the front position or the rear position. Accordingly, the center positions of the different particular rows PR belonging to the same parallel module PM, for example, the center positions of three particular rows PR, may be approximately matched (aligned) with one another. In an embodiment, the first and second position correction cells CB1 and CB2 may be arranged between the particular rows PR belonging to the same parallel module PM. The first and second position correction cells CB1 and CB2, which are provided between the preceding particular row PR and the subsequent particular row PR, may eliminate the position deviation between the particular rows PR.

Referring to FIG. 4, regarding the position of the particular row PR, the particular row PR may be formed in different rows different in the parallel modules PM neighboring each other. The particular rows PR being formed in different rows in the parallel modules PM neighboring each other may mean that, for example, in parallel modules A and B neighboring each other, when the particular rows PR of the parallel module A are formed in the fifth, seventh, and ninth rows, the particular rows PR of the parallel module B are formed in the second, fourth, tenth row so as not to overlap the particular rows PR of the parallel module A. In contrast, forming the particular rows PR in the same row in the parallel modules PM neighboring each other such that the particular rows PR overlap each other, a parallel connection is biased toward the front position or the rear position, the biased parallel connection toward the front position or the rear position are accumulated along the first axis Z1, and thus the length of a parallel connection may be increased or the size of a battery pack along the first axis Z1 may be increased.

For the parallel modules PM neighboring each other to include the particular rows PR in different rows, the battery pack may include battery unit U that is repeatedly arranged. As the battery unit U is repeatedly arranged along the first axis Z1, a configuration that the parallel modules PM neighboring each other includes the particular rows PR in rows different from each other may be easily implemented. For example, the battery unit U may include the parallel modules PM. Among the parallel modules PM, the parallel modules PM neighboring each other may include the particular rows PR formed in different rows from each other.

In an embodiment, the battery unit U may include six parallel modules A, B, C, D, E, and F. For example, the battery unit U may include parallel modules A, B, C, D, E, and F, the parallel module A may include the particular rows PR formed in the fifth, seventh, and ninth rows, and the parallel module B may include the particular rows PR formed in the second, fourth, and tenth rows. The parallel module C may include the particular rows PR formed in the first, sixth, and eighth rows. The parallel module D may include the particular rows PR formed in the third, fifth, and seventh rows, the parallel module E may include the particular rows PR formed in the second, ninth, and tenth rows, and the parallel module F may include the particular rows PR formed in the fourth, sixth, and eighth rows. As such, each of the parallel modules A, B, C, D, E, and F may include three particular rows PR, and a combination of the positions of the three particular rows PR may be mutually exclusive. In other words, comprehensively considering the positions of the particular rows PR formed in the parallel modules A, B, C, D, E, and F, the particular rows PR may be overlapped in any one row, but the particular rows PR may not be overlapped in two or three rows. The parallel modules PM in which the particular rows PR are overlapped in any one row may not neighbor each other (i.e., adjacent parallel modules do not include overlapping particular rows PR).

The battery pack according to an embodiment may be configured such that the battery unit U is repeatedly arranged along the first axis Z1. In this configuration, a void position V at which the battery cell B is empty may be formed in a boundary area between a first battery unit U1 and a second battery unit U2 along the first axis Z1. The void position V may be a configuration to facilitate the formation of the entire battery pack by simplifying the configuration of the battery unit U that is repeatedly arranged. For example, in an embodiment, the battery unit U may include the six parallel modules PM, and as the battery unit U including the six parallel modules PM is repeatedly arranged, the entire battery pack may be formed. When the void position V is not formed in the boundary area between the first battery unit U1 and the second battery unit U2 neighboring each other, the number of the parallel modules PM forming each of the first and second battery units U1 and U2 needs to be increased significantly, which may not serve the purpose of simplifying the structure of the entire battery pack and facilitating the implement of the battery pack through the repetitive arrangement of the battery unit U. In an embodiment, as the structure of the battery unit U may be simplified through the void position V, the battery unit U having a simplified structure is repeatedly arranged, and thus the implementation of a battery pack may be facilitated.

The void position V may mean a position where a battery cell B is not filled in the battery cells B arranged in one row along the first axis Z1. For example, in an embodiment, the battery cells B may be arranged in a row along the first axis Z1 at approximately constant intervals. The void position V may not be filled with the battery cells B and may be left as an empty space. In an embodiment, the void position V is formed in the boundary area between the first battery unit U1 and the second battery unit U2 neighboring each other along the first axis Z1. The boundary area may mean an area adjacent to (or between) the second battery unit U2 and the first battery unit U1, when the first and second battery units U1 and U2 are arranged to neighbor each other.

Referring to FIG. 7, in an embodiment, the electrical connection of the battery cells B may be achieved by a busbar 150 arranged on an upper end portion 10*a* of the battery cells B. First and second electrodes 11 and 12 formed on the upper end portion 10*a* of the battery cells B may be electrically connected to each other through the busbar 150. In an embodiment, the electrical connection of the battery cells B may be achieved through the upper end portion 10*a* of the battery cells B, and cooling, rather than the electrical connection, of the battery cells B may be achieved through a lower end portion 10*b* of the battery cells B.

The busbar 150 may extend in the first and second axes Z1 and Z2 and avoid the upper end portion 10*a* of the battery cells B to expose the first and second electrodes 11 and 12 formed on the upper end portion 10*a* of the battery cells B. In an embodiment, the busbar 150 may include a first part 151 extending along the first axis Z1 and a second part 152 extending along the second axis Z2 connected to the first part 151. The second part 152 may extend along the second axis Z2 across between the parallel modules PM neighboring each other. The first part 151 may extend along the first axis Z1 to connect the second parts 152 to each other or extend along the first axis Z1 for the third parallel connection CN3, and may extend to connect the parallel modules PM neighboring each other over the void position V (see FIG. 4). As such, the busbar 150 may include the first and second parts 151 and 152 respectively extending the first and second axes Z1 and Z2, but may generally extend along the second axis Z2 between the parallel modules PM neighboring each other.

The busbar 150 may include the first and second busbars 150*a* and 150*b* (see FIG. 4) extending from the first and second surfaces C1 and C2 of the circuit board C approximately along the second axis Z2, to form the first and second parallel modules PM1 and PM2 (see FIG. 2) to connect the first and second battery cells B1 and B2 respectively arranged at the first and second surfaces C1 and C2 of the circuit board C. In this configuration, the first and second parallel modules PM1 and PM2 (see FIG. 2) formed by the first and second busbars 150*a* and 150*b* extending from (away from) the first and second surfaces C1 and C2 of the circuit board C approximately along the second axis Z2 may be arranged from the first and second surfaces C1 and C2 of the circuit board C approximately along the second axis Z2.

Referring to FIG. 7, in an embodiment, the battery cells B belonging to the same parallel module PM may be connected together to the busbar 150 with the first and second electrodes 11 and 12 that are the same, forming the parallel module PM. The battery cells B different from each other belonging to the parallel module PM neighboring each other along the first axis Z1 may be connected to the busbar 150 in series to each other with the first and second electrodes 11 and 12 that are different from each other. As described below, a connection member W (see FIG. 7) for mediating an electrical connection between the first and second electrodes 11 and 12 of the battery cell B and the busbar 150 may be provided therebetween. As the connection member W connects the same poles of the battery cells B different from each other to the same busbar 150, a parallel connection may be formed. As the connection member W connects different poles of the battery cells B different from each other to the same busbar 150, a serial connection may be formed.

Referring to FIG. 8, each of the battery cells B may extend along a third axis Z3, and may be provided as a circular battery cell B. In other words, the battery cell B may have the upper end portion 10*a* and the lower end portion 10*b* that are circular at the upper and lower ends thereof along the third axis Z3, and a side surface 10*c* that is a cylindrical surface between the upper end portion 10*a* and the lower end portion 10*b*. In an embodiment, the battery cell B may include the second electrode 12 formed at the center position of the upper end portion 10*a* and the first electrode 11 may be formed entirely across the lower end portion 10*b* and extending to an edge position of the upper end portion 10*a* along the side surface 10*c*. In this configuration, both of the center position of the second electrode 12 and the edge position of the first electrode 11 may be formed in the upper end portion 10*a* of the battery cell B. Through the connection member W (see FIG. 7) connecting the upper end portion 10*a* of the battery cell B and the busbar 150 to each other, a parallel connection may be formed by connecting the first electrodes 11 or the second electrodes 12 formed on the upper end portion 10*a* of the battery cell B to each other to the same busbar 150. A serial connection may be formed by connecting the first and second electrodes 11 and 12 formed on the upper end portion 10*a* of the battery cell B to each other to the same busbar 150.

Referring to FIGS. 2 and 7, the electrical connection between the busbar 150 and the battery cell B may be achieved through the connection member W having one end portion combined (or connected) to the busbar 150 and the other portion combined (or connected) to the first and second electrodes 11 and 12 of the battery cell B. The connection member W may be formed by a conductive wire in the form of a metal micro-wire or a conductive ribbon in the form of a metal strip, and may connect between the battery cell B and the busbar 150 by wire bonding or ribbon bonding. In an embodiment, the connection member W may be formed in a conductive wire, and in the following description, the connection member W provided as a conductive wire is mainly described.

The connection member W may be combined to the busbar 150 and the first and second electrodes 11 and 12 of the battery cell B through wire bonding, and in a suspended state or position between the one end portion combined to the busbar 150 and the other portion combined to the battery cell B, may electrically connect the busbar 150 and the battery cell B that are respectively combined to the one end portion and the other portion.

The group of first battery cells B1 may form the first parallel modules PM1 (see FIG. 2) arranged along the first axis Z1, and the first parallel modules PM1 may form a series connection along the first axis Z1. Similarly, the group of second battery cells B2 may form the second parallel modules PM2 (see FIG. 2) arranged along the first axis Z1, and the second parallel modules PM2 may form a series connection along the first axis Z1. The first and second parallel modules PM1 and PM2 (see FIG. 2) may be respectively arranged at (extending from) the first and second surfaces C1 and C2 of the circuit board C that are different from each other, and may be connected in series at the first and second surfaces C1 and C2 of the circuit board C that are different from each other. In an embodiment, the first parallel modules PM1 may be connected in series from the front position to the rear position along the first axis Z1, and the second parallel modules PM2 may be connected in series along the first axis Z1 from the rear position to the front position. The first parallel module PM1 at the rearmost position and the second parallel module PM2 at the rearmost position, along the first axis Z1, may be electrically connected to each other through a third busbar 150*c* (see FIG. 1), and thus the first and second parallel modules PM1 and PM2 may be connected in series through the third busbar 150*c*. For example, an electrical connection direction (series connection direction) of the entire battery pack may be formed by a direction from the front position to the rear position along the first parallel modules PM1 arranged along the first axis Z1, a U-turn direction at the rearmost position through the third busbar 150*c* (see FIG. 1), and a direction from the rear position to the front position along the second parallel modules PM2 arranged along the first axis Z1.

In an embodiment, the first parallel module PM1 arranged at the rearmost side along the first axis Z1 and the second parallel module PM2 arranged at the rearmost side along the first axis Z1 may be connected to each other in series by the third busbar 150*c* that connects the first and second busbars 150*a* and 150*b* respectively forming the first and second parallel modules PM1 and PM2 at the rearmost position. Accordingly, in the battery pack according to an embodiment, the series connection direction may extend from the front position to the rear position along the first axis Z1 in the group of first battery cells B1, make a U-turn at the rearmost position, and then extend from the rear position to the front position along the first axis Z1 in the group of second battery cells B2.

FIG. 9 is a view showing the connection of the circuit board C of FIG. 3. FIG. 10 is a perspective view of the circuit board C of FIG. 9.

Referring to FIGS. 9-10, the circuit board C may be arranged between the group of first battery cells B1 and the group of second battery cells B2. The circuit board C may be arranged between the first and second battery cells B1 and B2, and may collect status information from the first and second battery cells B1 and B2 arranged at both sides of the circuit board C, and provide data to control the charge/discharge operation of the first and second battery cells B1 and B2. In an embodiment, the status information of the first and second battery cells B1 and B2 may include voltage information, temperature information, and current information of the first and second battery cells B1 and B2. As described below, in an embodiment, the circuit board C may obtain voltage information from the first and second battery cells B1 and B2 respectively arranged at the first and second surfaces C1 and C2 of the circuit board C, and temperature information from the second battery cells B2 arranged at one side of the circuit board C.

The circuit board C may include a base part Ca and a tab mounting part Cb protruding upward from the base part Ca along the third axis Z3. First and second connection tabs T1 and T2 may be mounted on the tab mounting part Cb and arranged extending toward the first and second battery cells B1 and B2, respectively, to be electrically connected to the first and second battery cells B1 and B2. For example, the first and second connection tabs T1 and T2 may be respectively mounted on the first and second surfaces C1 and C2 of the tab mounting part Cb, which oppose to each other. The tab mounting part Cb may be formed at an intermittent position along the first axis Z1, and may include the tab mounting parts Cb that are different from each other having different lengths along the first axis Z1. For example, some portions of the tab mounting part Cb may extend a relatively long length along the first axis Z1 so that both of the first and second connection tabs T1 and T2 are mounted thereon, and some portions of the tab mounting parts Cb may extend a relatively short length along the first axis Z1 so that any one connection tab T of the first and second connection tabs T1 and T2 is mounted thereon. As described below, the tab mounting part Cb, with the first and second connection tabs T1 and T2 mounted thereon, may be exposed above the upper holder 110*a*, and the first and second connection tabs T1 and T2 that penetrate a sensing hole 110*s* (see FIG. 13) of an upper holder 110*a* and are exposed above the upper holder 110*a* may be electrically connected to the first and second busbars 150*a* and 150*b* respectively connected to the first and second battery cells B1 and B2. In the descriptions below, the forming of the first and second connection tabs T1 and T2 on the first and second surfaces C1 and C2 of the circuit board C may mean that the first and second connection tabs T1 and T2 are formed on the first and second surfaces C1 and C2 of the tab mounting part Cb of the circuit board C.

The connection tab T protruding toward the first and second battery cells B1 and B2 may be formed on the circuit board C, that is, the tab mounting part Cb of the circuit board C. In other words, the connection tab T may include the first and second connection tabs T1 and T2 respectively protruding toward the first and second battery cells B1 and B2. For example, the circuit board C may include the first and second surfaces C1 and C2 that oppose each other, the first connection tab T1 protruding toward the first battery cells B1 may be formed on the first surface C1 of the circuit board C, and the second connection tab T2 protruding toward the second battery cells B2 may be formed on the second surface C2 of the circuit board C. The first and second connection tabs T1 and T2 may be formed on the tab mounting part Cb of the circuit board C protruding upward along the third axis Z3, and may be formed at a height approximately equal to the height of the first and second busbars 150*a* and 150*b* arranged above the first and second battery cells B1 and B2. The third axis Z3, which is a direction crossing the first and second axes Z1 and Z2, may mean, for example, a direction mutually perpendicular to the first and second axes Z1 and Z2, and a length direction in which the first and second battery cells B1 and B2 extend.

The first and second connection tabs T1 and T2 may be electrically connected to the circuit board C, so that the voltage information of the first and second battery cells B1 and B2 may be transmitted from the first and second connection tabs T1 and T2 to the circuit board C. In an embodiment, each of the first and second connection tabs T1 and T2 may include a fixed surface Ta coupled to the first and second surfaces C1 or C2, respectively, of the circuit board C and a coupling surface Tb in contact with the fixed surface Ta via one edge and forming an uppermost surface along the third axis Z3. The fixed surface Ta of the first and second connection tabs T1 and T2 may be fixed on the first and second surfaces C1 and C2, respectively, of the circuit board C by soldering and the like, the connection member W for detection (see FIG. 9) may be combined to the coupling surface Tb of the first and second connection tabs T1 and T2. In an embodiment, each of the first and second connection tabs T1 and T2 may be formed as a rectangular metal block having the fixed surface Ta and the coupling surface Tb in contact with each other at one edge, particularly a rectangular metal block having the third axis Z3 as the major axis. For example, each of the first and second connection tabs T1 and T2 may be formed as a rectangular nickel block. In another embodiment, each of the first and second connection tabs T1 and T2 may have a metal thin plate having a bent structure, for example, as a nickel plate having a bent structure. In this configuration, each of the first and second connection tabs T1 and T2 may include the fixed surface Ta coupled to the first and second surfaces C1 or C2, respectively, of the circuit board C and the coupling surface Tb bent from the fixed surface Ta extending toward the first and second battery cells B1 or B2.

Referring to FIG. 9, the first and second connection tabs T1 and T2 on the circuit board C may be electrically connected to the first and second busbars 150*a* and 150*b*, respectively, forming the first and second parallel modules PM1 and PM2, respectively. In other words, the connection member W for detection mediating the electrical connection therebetween may be provided between the first and second connection tabs T1 and T2 and the first and second busbars 150*a* and 150*b*. The connection member W for detection may include one end portion combined to a respective one of the first and second connection tabs T1 and T2 and the other portion combined to a respective one of the first and second busbars 150*a* and 150*b*, and may extend in a suspended state between the one end portion and the other portion respectively connected to the first and second connection tabs T1 and T2 and the first and second busbars 150*a* and 150*b* through wire bonding. For example, the connection member W for detection may be combined to one end of each of the first and second busbars 150*a* and 150*b* and extend along the second axis Z2, and may be combined to the first part 151 or the second part 152 forming the one end of each of the first and second busbars 150*a* and 150*b*. In other words, the connection member W for detection may be combined (connected) to the first part 151 extending along the first axis Z1 or the second part 152 extending along the second axis Z2, among the first and second busbars 150*a* and 150*b*. In an embodiment, when one end of each of the first and second busbars 150*a* and 150*b* includes the first part 151, the formation positions of the first and second connection tabs T1 and T2 arranged along the first axis Z1 may be limited by the first part 151 extending along the first axis Z1. Accordingly, the tab mounting part Cb on which only one connection tab T of the first and second connection tabs T1 and T2 is mounted may be arranged at a position overlapping the first part 151. For example, the first and second connection tabs T1 and T2 may be mounted together on the tab mounting part Cb of the circuit board C. When one end of at least any one busbar 150 of the first and second busbars 150*a* and 150*b* is formed of the first part 151, the tab mounting part Cb on which only one connection tab T of the first and second connection tabs T1 and T2 is mounted may be arranged at a position overlapping the first part 151.

In an embodiment, the voltage of the first and second battery cells B1 and B2 connected in parallel to each other through the first and second busbars 150*a* and 150*b* may be measured by detecting the voltage of the first and second busbars 150*a* and 150*b*. In an embodiment, the connection member W for detection may be formed in parallel between the first and second busbars 150*a* and 150*b* and the first and second connection tabs T1 and T2. Through two or more of the connection members W for detection connected in parallel therebetween, in spite of disconnection of any one connection member W for detection, the electrical connection between the first and second busbars 150*a* and 150*b* and the first and second connection tabs T1 and T2 may be maintained.

A plurality of the first and second connection tabs T1 and T2 may be arranged along the first axis Z1 in which the circuit board C extends. The voltage information of the first and second battery cells B1 and B2 arranged at both sides of the circuit board C may be obtained through the first and second connection tabs T1 and T2 arranged along the first axis Z1. The first and second connection tabs T1 and T2 may be formed at different positions of the circuit board C along the first axis Z1, particularly at different positions apart from each other. In other words, the first connection tab T1 may include a plurality of first connection tabs T1 formed at positions spaced apart from each other along the circuit board C to be electrically connected to the first busbars 150*a* that are different from each other and arranged along the first axis Z1. The voltage of the first parallel modules PM1 (see FIG. 2) that are different from each other and arranged along the first axis Z1 may be measured through the first connection tabs T1. Similarly, the second connection tab T2 may include a plurality of second connection tabs T2 formed at positions spaced apart from each other along the circuit board C to be electrically connected to the second busbars 150 that are different from each other and arranged along the first axis Z1. The voltage of the second parallel modules PM2 (see FIG. 2) that are different from each other and arranged along the first axis Z1 may be measured through the second connection tabs T2. As such, the first connection tabs T1 are formed at positions spaced apart from each other along the circuit board C, and the second connection tabs T2 are formed at positions spaced apart from each other along the circuit board C. The first and second connection tabs T1 and T2, which are formed at positions spaced apart from each other along the circuit board C, may eliminate (or at least mitigate) electrical and physical interference therebetween.

The circuit board C may be arranged in a state of standing (an upright state) between the first and second battery cells B1 and B2. For example, the circuit board C may be arranged in a state of standing along the third axis Z3 corresponding to the length direction of the first and second battery cells B1 and B2. In an embodiment, the circuit board C may be arranged in a standing state such that the first and second surfaces C1 and C2 of the circuit board C that oppose each other face the first and second battery cells B1 and B2, respectively. As such, because the circuit board C is arranged in a standing state, not in a state of being laid between the first and second battery cells B1 and B2, space taken by the circuit board C may be saved, and the electrical connection between the first and second parallel modules PM1 and PM2 (see FIG. 2) may be facilitated through the first and second connection tabs T1 and T2 formed on the first and second surfaces C1 and C2 of the circuit board C. For example, because the circuit board C is arranged in a standing state (an upright state), the first and second connection tabs T1 and T2 formed on the tab mounting part Cb of the circuit board C protrude upward along the third axis Z3, and the first and second busbars 150*a* and 150*b*, may be formed at an approximately equal height, and the electrical connection between the first and second connection tabs T1 and T2 and the first and second busbars 150*a* and 150*b* that are formed at an approximately equal height may be facilitated. For example, wire bonding of the connection member W for detection that mediates the electrical connection between the first and second connection tabs T1 and T2 and the first and second busbars 150*a* and 150*b* may be facilitated, and the length of the connection member W for detection may be shortened, thereby reducing risk of disconnection.

In an embodiment, the first and second busbars 150*a* and 150*b* may be arranged on the upper holder 110*a*, and the first and second connection tabs T1 and T2 may be connected to the circuit board C arranged below the upper holder 110*a*. However, as the first and second connection tabs T1 and T2 are formed on the tab mounting part Cb of the circuit board C that penetrates the sensing hole 110*s* formed in the upper holder 110*a* and is exposed above the upper holder 110*a*, the first and second connection tabs T1 and T2 and the first and second busbars 150*a* and 150*b* may be formed at the approximately equal height.

In an embodiment, the circuit board C is arranged between the first and second battery cells B1 and B2. The voltage information of the first and second battery cells B1 and B2 arranged at both sides (opposite sides) of the circuit board C may be detected through the connection member W for detection combined to the first and second connection tabs T1 and T2 that are coupled to the first and second surfaces C1 and C2 of the circuit board C. However, the disclosure is not limited thereto, and for example, the circuit board C may not be arranged between the first and second battery cells B1 and B2. The circuit board C may be arranged at one side of the first battery cells B1 and may detect the voltage information of the first battery cells B1 arranged at one side of the circuit board C, through the connection member W for detection combined to the first connection tab T1 that is coupled to the first surface C1 of the circuit board C. In other words, the battery pack according to various embodiments may not include the arrangement of the first and second battery cells B1 and B2 arranged at both sides of the circuit board C, but may include only the first battery cells B1 arranged at one side of the circuit board C, and may not include the second battery cells B2 arranged at the other side of the circuit board C. In such an embodiment, the first connection tab T1 may be coupled to the first surface C1 of the circuit board C and protrude toward the first battery cells B1. The connection member W for detection that mediates the electrical connection between the first connection tab T1 and the first battery cells B1 may be formed. In an embodiment, the connection member W for detection may include one end portion combined to the first connection tab T1 and the other portion combined to the first busbar 150*a* connected to the first battery cells B1, and may electrically connect the first connection tab T1 and the first busbar 150*a* to each other. In such an embodiment, the circuit board C may be arranged in a standing state (upright state) to face the first battery cells B1. Furthermore, the first battery cells B1 may include a plurality of first battery cells B1 arranged along the second axis Z2 in which the first busbar 150*a* extends, or along the second axis Z2 in which the first connection tab T1 protrudes from the first surface C1 of the circuit board C. As the first battery cells B1 arranged along the second axis Z2 are connected in parallel to each other through the first busbar 150*a*, the first parallel module PM1 (see FIG. 2) may be formed. The circuit board C may include the first connection tabs T1 arranged along the first axis Z1, and may detect the voltage of the first parallel modules PM1 (see FIG. 2) that are different from each other through the first busbar 150 connected to the first parallel modules PM1 (see FIG. 2) that are different from each other and arranged along the first axis Z1.

FIG. 11 is a perspective view showing a mounting structure of a thermistor 170 for obtaining temperature information of a battery cell.

Referring to FIG. 11, the thermistor 170 may be arranged on the circuit board C. The thermistor 170, which is configured to obtain the temperature information of the battery cell B, may include, for example, a thermistor chip 175 including a variable resistance that varies according to a temperature, and a thermistor lead 171 connected to the thermistor chip 175. One end portion of the thermistor lead 171 may be coupled to the circuit board C, and the thermistor chip 175 coupled to the other portion of the thermistor lead 171 may be in contact with the first battery cells B1 or the second battery cells B2 or arranged at an at least adjacent position to obtain the temperature information thereof, through the thermistor lead 171 extending from the one end portion coupled to the circuit board C toward the first battery cells B1 or the second battery cells B2.

In an embodiment, among the group of first battery cells B1 or the group of second battery cells B2 arranged at both sides of the circuit board C, the thermistor 170 may alternatively obtain the temperature information of any one group of the battery cells B. In an embodiment, the thermistor 170 may estimate a temperature distribution of the entire battery pack by obtaining the temperature information only of any group of the battery cells B having an equal temperature by forming a thermal balance (thermal equilibrium) through a narrow space in which the circuit board C is accommodated, without having to obtain the temperature information of both of the group of first battery cells B1 and the group of second battery cells B2 that face each other with the circuit board C therebetween.

In an embodiment, the thermistor 170 may alternatively obtain the temperature information of the group of first battery cells B1 among the group of first battery cells B1 or the group of second battery cells B2. In this configuration, the thermistor 170 obtaining the temperature information of the group of first battery cells B1 may not only mean collectively obtaining all temperatures of the entire group of first battery cells B1, but may mean obtaining the temperatures of one or two or more first battery cells B1 optionally among the group of first battery cells B1. In an embodiment, the thermistor 170 may obtain temperature information of two of the first battery cells B1 arranged at different positions along the first axis Z1, among the group of first battery cells B1. For example, the two first battery cells B1 subject to the temperature measurement may be the two first battery cells B1 arranged at different positions along the first axis Z1 directly facing the circuit board C. In other words, the first battery cells B1 subject to the temperature measurement by the thermistor 170 may be located close to the circuit board C to be easy to access by the thermistor 170 fixed on the circuit board C, and arranged inside a battery pack in which the circuit board C is arranged, so as to be difficult or unlikely to be in contact with low-temperature outside atmosphere. Accordingly, the possibility of degradation due to overheating may be quickly captured by obtaining the temperature information of the first battery cells B1 arranged at an inner position where the temperature rise is relatively concerning.

In an embodiment, by obtaining the temperature information of the first battery cells B1 through the thermistor 170 coupled to the circuit board C between the first and second battery cells B1 and B2, without having to obtain the temperature information of the second battery cells B2 facing the first battery cells B1 subject to the temperature measurement with the circuit board C therebetween, the temperature information of the first and second battery cells B1 and B2 forming a thermal balance (thermal equilibrium) through a narrow space in which the circuit board C is accommodated may be measured and estimated.

The thermistor 170 mounted on the circuit board C, which extends from the one end portion of the thermistor lead 171 coupled to the circuit board C toward the first battery cells B1, may allow the thermistor chip 175 formed on the other portion of the thermistor lead 171 to be in contact with the first battery cells B1 or to access at least the first battery cells B1. In this configuration, the mounting of the thermistor 170 uses a method of pressing the circuit board C against the first battery cells B1 arranged at one side of the circuit board C, particularly by allowing the thermistor chip 175 to be in contact with or access to the first battery cells B1. As such, in the mounting of the thermistor 170, as the circuit board C may be pressed against the first battery cells B1 arranged at one side of the circuit board C, compared to a method of pressing the circuit board C against the first and second battery cells B1 and B2 arranged at both sides of the circuit board C, the mounting of the thermistor 170 may be facilitated. Considering the convenience in mounting the thermistor 170, among a group of the first and second battery cells B1 and B2, alternatively any group of the battery cell B, that is, the temperature information of the group of first battery cells B1 only, may be obtained. For the thermistor 170 to obtain all of the temperature information of the first and second battery cells B1 and B2, during the mounting of the thermistor 170, as the circuit board C needs to be pressed against the first and second battery cells B1 and B2 arranged at both sides of the circuit board C, workability of the mounting of the thermistor 170 may deteriorate. A thermal conductive adhesive (thermal grease or thermal silicone) may be formed around the thermistor chip 175 to reduce heat resistance of the first battery cells B1.

The thermistor 170 may be coupled at a height closer to an upper end portion than a lower end portion of the circuit board C along the third axis Z3. To detect accurate temperature information of the first battery cells B1, the thermistor 170 may be coupled at a height closer to the upper end portion than the lower end portion of the circuit board C in which a cooling plate 130 (see FIG. 1) is arranged. For example, the thermistor lead 171 of the thermistor 170 that is coupled to the circuit board C may be coupled at a height closer to the upper end portion than the lower end portion of the circuit board C. Accordingly, the thermistor 170 may avoid a detection error caused by cooling from the cooling plate 130 (see FIG. 1), and thereby accurately detect the temperature of the first battery cells B1. For example, in an embodiment, the cooling plate 130 may be formed closer to the lower end portion than the upper end portion of the circuit board C along the third axis Z3 in which the first battery cells B1 extends. In order to avoid the detection error by the cooling plate 130 (see FIG. 1), the thermistor 170 may be formed at a height close to (e.g., proximate to) the upper end portion of the circuit board C.

FIG. 12 is an exploded perspective view showing an assembly of the cell holder 110 and the battery cell B of FIG. 1. FIG. 13 is an exploded perspective view showing an assembly of the cell holder 110 and the circuit board B of FIG. 12. FIG. 14 is a view for explaining the sensing hole 110*s* of the cell holder 110.

Referring to FIGS. 12-14, the battery cells B may be assembly by being inserted in the cell holder 110. As the battery cells B are inserted in the cell holder 110, an assembly position may be restricted. For example, the cell holder 110 may include the upper holder 110*a* into which the upper end portions 110*a* of the battery cells B are inserted, and a lower holder 110*b* into which the lower end portions 110*b* of the battery cells B are inserted.

The upper holder 110*a* may include an upper holder main body 110*aa* extending across the battery cells B and the upper end portion of the circuit board C, a plurality of upper cell assembly ribs 111*a* protruding from the upper holder main body 110*aa* toward the battery cells B, each upper assembly rib 11*a* surrounding the upper end portion 10*a* of one of the battery cells B, an upper substrate assembly rib 113*a* protruding from the upper holder main body 110*aa* toward the circuit board C to surround the upper end portion of the circuit board C, and a plurality of terminal holes 112*a*, each terminal hole 112 exposing the first and second electrodes 11 and 12 formed on the upper end portion 10*a* of one of the battery cells B.

In an embodiment, the upper holder main body 110*aa* may be in the form of a plate member extending across the upper end portion 10*a* of the battery cell B. As described below, in an embodiment, most of an accommodation space for accommodating the battery cells B and the circuit board C may be provided by the lower holder 110*b*. As the upper holder 110*a* is coupled to the lower holder 110*b* to face each other, one side of the accommodation space may be closed. In an embodiment, the upper holder 110*a* may be approximately in a plate shape, and the lower holder 110*b* may be approximately in a box shape.

Each upper cell assembly rib 111*a* may restrict the assembly position of one of the battery cells B by surrounding the upper end portion 10*a* of the battery cell B. Each of the terminal holes 112*a* for exposing the first and second electrodes 11 and 12 formed on the upper end portion 10*a* of the battery cell B may be formed in the upper cell assembly rib 111*a*. The first and second electrodes 11 and 12 of the battery cell B exposed through the terminal hole 112*a* may be connected to the busbar 150 through the connection member W (see FIG. 7). In other words, the busbar 150 may be arranged on the upper holder 110*a* and may be connected to the first and second electrodes 11 and 12 of the battery cell B exposed through the terminal hole 112*a* of the upper holder 110*a*.

The upper cell assembly ribs 111*a* and the terminal holes 112*a* may be formed in first and second areas where a group of the first and second battery cells B1 and B2 are arranged, in the upper holder 110*a*, and the upper substrate assembly rib 113*a* may be formed in a third area between the first and second areas, in which the circuit board C is arranged. The upper substrate assembly rib 113*a* may extend along the first axis Z1 to surround the upper end portion of the circuit board C, and restrict the assembly position of the circuit board C. For example, the upper substrate assembly rib 113*a* may locate the circuit board C at a regular position (an upright position) by surrounding the thickness of the circuit board C between the first and second surfaces C1 and C2, and may provide a groove into which the thickness of the circuit board C is inserted. In an embodiment, the circuit board C may include the base part Ca and the tab mounting part Cb protruding from the base part Ca upward along the third axis Z3. The position of the base part Ca may be fixed as the base part Ca is inserted into the upper substrate assembly rib 113*a* formed on the lower surface of the upper holder 110*a*. The position of the tab mounting part Cb may be fixed as the tab mounting part Cb penetrates the upper holder 110*a* via the sensing hole 110*s* of the upper holder 110*a*. In other words, in an embodiment, the upper substrate assembly rib 113*a* may hold the upper end portion of the base part Ca of the circuit board C.

In an embodiment, the first and second areas where the first and second battery cells B1 and B2 are arranged, and the third area where the circuit board C is arranged, may be integrally formed at different positions of the upper holder 110*a*. In the upper holder 110*a*, an insulating wall 119 (see FIG. 12) may be formed at a boundary of the third area where the circuit board C is arranged (e.g., a boundary between the third area and the first and second area). For example, the insulating wall 119 may include a pair of insulating walls 119 including an insulating wall 119 arranged at a boundary between the first and third areas and another insulating wall 119 arranged at a boundary between the second and third areas. In other words, the insulating wall 119 may include a pair of insulating walls 119 extending in parallel along the first axis Z1. The insulating wall 119 may be formed on an upper surface of the upper holder 110*a* along the third axis Z3, and may prevent electrical interference between the first and second busbars 150*a* and 150*b* and the circuit board C arranged in the first and second areas on the upper surface of the upper holder 110*a*. For example, the positions of the first and second busbars 150*a* and 150*b* may be aligned by the insulating wall 119, and may avoid electrical interference with the circuit board C and the like through the insulating wall 119. In addition to the insulating wall 119, a plurality of position alignment ribs 118 (see FIG.

12) for position alignment of the first and second busbars 150*a* and 150*b* may be formed on the upper surface of the upper holder 110*a*. The position alignment ribs 118 may extend along the first and second axes Z1 and Z2 on the upper surface of the upper holder 110*a*, and may allow the first and second busbars 150*a* and 150*b* to be located at regular positions. For example, the position alignment ribs 118 may prevent the first and second electrodes 11 and 12 of the first and second battery cells B1 and B2 exposed through the terminal hole 112*a* from being blocked due to the position misalignment of the first and second busbars 150*a* and 150*b*.

The insulating wall 119 extends along a boundary between the first and second areas and the third area. In an embodiment, a through hole 119*a* (see FIG. 14) may be formed in the insulating wall 119 to allow a connection between the first and second busbars 150*a* and 150*b* arranged in the first and second areas and the circuit board C, that is, the first and second connection tabs T1 and T2 coupled to circuit board C, arranged in the third area. The through hole 119*a* (see FIG. 14) of the insulating wall 119 may be intermittently formed at positions where the first and second connection tabs T1 and T2 are formed along the first axis Z1 (i.e., the positions of the through holes 119*a* may correspond to the positions of the first and second connection tabs T1 and T2). Through the through hole 119*a* (see FIG. 14) of the insulating wall 119, the connection member W for detection (see FIG. 14) extending across the first and second areas and the third area may connect between the first and second connection tabs T1 and T2 and the first and second busbars 150*a* and 150*b*. Due to the formation of the through hole 119*a* (see FIG. 14), the insulating wall 119 is formed intermittently rather than continuously along the first axis Z1.

The upper holder 110*a* may include the insulating wall 119 extending in parallel (or substantially parallel) along the first axis Z1, and the upper substrate assembly rib 113*a*. The insulating wall 119 may be formed on the upper surface of the upper holder 110*a* opposite to the circuit board C, and the upper substrate assembly rib 113*a* may be formed on the lower surface of the upper holder 110*a* facing the circuit board C. The insulating wall 119 may be formed in a pair of insulating walls 119 with the circuit board C and the first and second connection tabs T1 and T2 connected to the circuit board C therebetween. The width between a pair of insulating walls 119 may be formed to be relatively wide enough to accommodate all of the thickness between the first and second surfaces C1 and C2 of the circuit board C, the first connection tab T1 formed on the first surface C1 of the circuit board C, and the second connection tab T2 formed on the second surface C2 of the circuit board C. Unlike the above, the width of the upper substrate assembly rib 113*a* may be formed to be relatively narrow enough to accommodate the thickness between the first and second surfaces C1 and C2 of the circuit board C.

The insulating wall 119 and the upper substrate assembly rib 113*a* may be formed along the first axis Z1 intermittently rather than continuously. For example, the insulating wall 119 may be formed discontinuously due to the through hole 119*a* (see FIG. 14) formed at the positions of the first and second connection tabs T1 and T2 along the first axis Z1. The upper substrate assembly rib 113*a* may be formed discontinuously due to a slit SI for exposing the tab mounting part Cb on which the first and second connection tabs T1 and T2 are mounted along the first axis Z1. As such, the insulating wall 119 and the upper substrate assembly rib 113*a* may be formed discontinuously due to the through hole 119*a* (see FIG. 14) and the slit SI along the first axis Z1, respectively.

Referring to FIG. 12, the lower holder 110*b* may include a lower holder main body 110*ba* formed across the battery cells B and the lower end portion of the circuit board C, a plurality of lower cell assembly ribs 111*b* protruding from the lower holder main body 110*ba* toward the battery cells B, each lower cell assembly rib 11*b* surrounding the lower end portion 10*b* of one of the battery cells B, a lower substrate assembly rib 113*b* protruding from the lower holder main body 110*ba* toward the circuit board C and surrounding the lower end portion of the circuit board C, and a plurality of cooling holes 112*b*, each cooling hole 112 exposing at least part of the lower end portion 10*b* of one of the battery cells B.

In an embodiment, the lower holder main body 110*ba* may be formed as a box shaped member including a surface extending across the lower end portion 10*b* of the battery cells B. In an embodiment, the lower holder 110*b* may be formed in a box shape and may provide most of the accommodation space for accommodating the battery cells B and the circuit board C. The upper holder 110*a* arranged facing the lower holder 110*b* may close one side of the accommodation space.

Each lower cell assembly rib 111*b* may restrict the assembly position of the battery cell B by surrounding the lower end portion 10*b* of one of the battery cells B. The cooling holes 112*b* for exposing the lower end portion 10*b* of each of the battery cells B may be formed in the lower cell assembly rib 111*b*. Each cooling hole 112*b* exposes the lower end portion 10*b* of one of the battery cells B, and increases thermal contact through the cooling hole 112*b* between the lower end portion 10*b* of the battery cell B exposed from the lower holder 110*b* and the cooling plate 130 (see FIG. 1) arranged below the lower holder 110*b*, thereby increasing the cooling efficiency of the battery cell B. In an embodiment, the upper holder 110*a* and the lower holder 110*b* may be assembled to face each other with the battery cells B therebetween along the third axis Z3. The cooling plate 130 (see FIG. 1) may be arranged below the lower holder 110*b*. A heat transfer sheet 120 (see FIG. 1) for promoting heat transfer between the lower end portions 10*b* of the battery cells B exposed through the cooling holes 112*b* of the lower holder 110*b* and the cooling plate 130 may be provided between the lower holder 110*b* and the cooling plate 130. A cover 180 (see FIG. 1) may be arranged above the upper holder 110*a*.

The lower cell assembly ribs **1*l*1***b* and the cooling holes 112*b* may be formed in the first and second areas where a group of the first and second battery cells B1 and B2 is arranged, in the lower holder 110*b*, and the lower substrate assembly rib 113*b* may be formed in the third area where the circuit board C is arranged, between the first and second areas. In an embodiment, the first and second areas where the first and second battery cells B1 and B2 are arranged, and the third area where the circuit board C is arranged, may be integrally formed at different positions of the lower holder 110*b*.

The lower substrate assembly rib 113*b* may extend along the first axis Z1 to surround the lower end portion of the circuit board C, and restrict the assembly position of the circuit board C. The upper end portion and the lower end portion of the circuit board C are inserted into the upper substrate assembly rib 113*a* and the lower substrate assembly rib 113*b*, respectively, and thus the position of the circuit board C may be fixed. In other words, according to an embodiment, the cell holder 110 may fix not only the position of the battery cells B, but also the position of the circuit board C. In an embodiment, the upper substrate assembly rib 113*a* and the lower substrate assembly rib 113*b* may accommodate an adhesive to firmly fix the circuit board C. The adhesive connection between the upper substrate assembly rib 113*a* and the lower substrate assembly rib 113*b*, and between the upper end portion and the lower end portion of the circuit board C, may be achieved via the adhesive.

In an embodiment, the upper holder 110*a* and the lower holder 110*b* may be formed in a structure in which the first area where the group of first battery cells B1 is arranged, the second area where the group of second battery cells B2 is arranged, and the third area where the circuit board C is arranged are integrally formed. For example, the third area where the circuit board C is arranged may extend along the first axis Z1 along between the first area where the first battery cells B1 are arranged and the second area where the second battery cells B2 are arranged. The upper holder 110*a* and the lower holder 110*b* are coupled to each other to face each other along the third axis Z3, and the accommodation space for accommodating the group of first battery cells B1, the group of second battery cells B2, and the circuit board C may be formed therebetween.

Referring to FIG. 12, an assembly structure of the upper holder 110*a* and the lower holder 110*b* may be formed along the edges of the upper holder 110*a* and the lower holder 110*b*. For example, a holder assembly rib 115A may be formed on any one holder of the upper holder 110*a* and the lower holder 110*b*, and a holder assembly groove 115B into which the holder assembly rib 115A is inserted may be formed on the other holder. In an embodiment, an adhesive for forming a firm combination between the upper holder 110*a* and the lower holder 110*b* may be provided between the holder assembly rib 115A and the holder assembly groove 115B formed on the upper holder 110*a* and the lower holder 110*b*. For example, when an adhesive is accommodated in the holder assembly groove 115B, as the holder assembly rib 115A is inserted into the holder assembly groove 115B accommodating the adhesive, an adhesive connection between the holder assembly groove 115B and the holder assembly rib 115A may be formed.

Referring to FIG. 13 and FIG. 14, the sensing hole 110*s* for continuously exposing the slit SI for exposing the tab mounting part Cb of the circuit board C and first and second tab holes TH1 and TH2 for exposing the first and second connection tabs T1 and T2 mounted on the tab mounting part Cb of the circuit board C, may be formed in the upper holder 110*a*. As the sensing hole 110*s* exposes the first and second connection tabs T1 and T2, a connection between the first and second connection tabs T1 and T2 and the first and second busbars 150*a* and 150*b* may be possible. The connection between the first and second connection tabs T1 and T2 exposed above the upper holder 110*a* and the first and second busbars 150*a* and 150*b* arranged on the upper holder 110*a* may be possible through the sensing hole 110*s*.

The sensing hole 110*s* may be intermittently formed at positions spaced apart from each other along the first axis Z1 in which the circuit board C extends. The sensing hole 110*s* may expose the tab mounting part Cb of the circuit board C intermittently formed at positions spaced apart from each other along the first axis Z1, and the first and second connection tabs T1 and T2 mounted on the tab mounting part Cb. In other words, the sensing hole 110*s* may include the slit SI for exposing the tab mounting part Cb of the circuit board C, and the first and second tab holes TH1 and TH2 for exposing the first and second connection tabs T1 and T2 mounted on the tab mounting part Cb of the circuit board C. The slit SI and the first and second tab holes TH1 and TH2 may be continuously formed together.

In an embodiment, the sensing hole 110*s* may be formed by including the slit SI and both of the first and second tab holes TH1 and TH2, or the slit SI and only one tab hole of the first and second tab holes TH1 and TH2. In other words, the sensing hole 110*s* may expose, with the tab mounting part Cb of the circuit board C, the first and second connection tabs T1 and T2 mounted on the tab mounting part Cb. While both of the first and second connection tabs T1 and T2 are mounted on some tab mounting parts Cb according to the position of the tab mounting part Cb along the first axis Z1, only one connection tab T of the first and second connection tabs T1 and T2 may be mounted on the other tab mounting parts Cb. According to the difference in the structure of the tab mounting part Cb, while some sensing holes 110*s* include, with the slit SI, both the first and second tab holes TH1 and TH2 along the first axis Z1, the other sensing holes 110*s* may include, with the slit SI, only one tab hole of the first and second tab holes TH1 and TH2.

The slit SI of the sensing hole 110*s* may expose the tab mounting part Cb of the circuit board C and may be formed along the first axis Z1. The first and second tab holes TH1 and TH2 of the sensing hole 110*s* may expose the first and second connection tabs T1 and T2 respectively formed on the first and second surfaces C1 and C2 of the tab mounting part Cb. The first and second tab holes TH1 and TH2 may extend in the opposite directions from the slit SI along the second axis Z2. In an embodiment, the first and second tab holes TH1 and TH2 may be formed at different positions along the first axis Z1. For example, the first and second tab holes TH1 and TH2 may be formed at both opposite end portions of the slit SI along the first axis Z1. The first and second connection tabs T1 and T2 coupled to the first and second surfaces C1 and C2 of the circuit board C may be formed at different positions of the circuit board C along the first axis Z1, to avoid the interference due to the soldering material and the like for the connection with the circuit board C. The first and second tab holes TH1 and TH2 for exposing the first and second connection tabs T1 and T2 formed at different positions along the first axis Z1 may be formed at different positions along the first axis Z1. The first and second connection tabs T1 and T2 exposed through the first and second tab holes TH1 and TH2 may be respectively connected to the first and second busbars 150*a* and 150*b* through the connection member W for detection. The slit SI of the sensing hole 110*s* may expose the tab mounting part Cb of the circuit board C. The upper substrate assembly rib 113*a* for holding the thickness of the circuit board C may be discontinuous due to the slit SI, and due to the slit SI, the upper substrate assembly rib 113*a* may not be formed continuously along the first axis Z1, but may be formed intermittently along the first axis Z1.

The upper holder 110*a* and the lower holder 110*b* may be formed at different heights along the third axis Z3. In an embodiment, the upper holder 110*a* may be formed in a substantially plate shape, and the lower holder 110*b* may be formed in a substantially box shape with an open upper end. For example, the accommodation space for accommodating the battery cells B and the circuit board C may be provided by the lower holder 110*b* in a substantially box shape (with an open upper end), and the upper holder 110*a* in a plate shape may perform a cover function to close the accommodation space of the lower holder 110*b*. In other words, in an embodiment, the height of the lower holder 110*b* may be greater than the height of the upper holder 110*a*.

Referring to FIG. 13, the upper substrate assembly rib 113*a* surrounding the upper end portion of the circuit board C, and the slit SI for exposing the upper end portion of the circuit board C, may be alternately formed on the upper holder 110*a* along the first axis Z1 of the circuit board C. In an embodiment, the base part Ca and the tab mounting part Cb may be alternately arranged on the upper end portion of the circuit board C along the first axis Z1. Accordingly, the upper substrate assembly rib 113*a* for holding the thickness of the base part Ca, and the slit SI for exposing the tab mounting part Cb, may be alternately formed on the upper holder 110*a* along the first axis Z1. In other words, the upper substrate assembly rib 113*a* for fixing the position of the circuit board C may be formed in a portion where the slit SI is not formed, that is, a portion covering the upper end portion of the circuit board C, in the upper holder 110*a*. As the upper holder 110*a* exposes the upper end portion of the circuit board C through the slit SI, the connection between the first and second connection tabs T1 and T2 coupled to the circuit board C and the connection member W for detection is allowed, and thus the position of the circuit board C may be fixed through the upper substrate assembly rib 113*a* formed in the portion covering the upper end portion of the circuit board C.

Referring to FIG. 1, in an embodiment, the busbar 150 may be fixed on the upper holder 110*a*. To this end, an adhesive (not shown) may be applied to the upper holder 110*a*, and as the busbar 150 is placed on the upper holder 110*a* to which the adhesive is applied, the first and second busbars 150*a* and 150*b* may be fixed on the upper surface of the upper holder 110*a*, that is, the first and second areas of the upper holder 110*a*, respectively. In other words, an adhesive combination of the upper holder 110*a* and the first and second busbars 150*a* and 150*b* may be possible via the adhesive.

The upper holder 110*a* on which the busbar 150 is fixed may be filled with potting resin (not shown). The potting resin filling the upper holder 110*a* may embed, with the busbar 150, the connection member W (see FIG. 7) connected to the busbar 150 and fix the position of the connection member W, and thus short circuit or disconnection according to the movement of the connection member W due to external shock or vibration may be prevented, and the connection member W may be insulated from the external environment.

The battery pack according to an embodiment may be advantageous for miniaturization and may provide a high-capacity output.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

INDUSTRIAL APPLICABILITY

One or more embodiments relate to battery packs.

The invention claimed is:

1. A battery pack, comprising:

a plurality of battery cells arranged along a plurality of rows, each of the plurality of rows extending in parallel to a first axis, the plurality of battery cells being arranged in rows adjacent to each other along a second axis crossing the first axis, and the rows adjacent to each other being misaligned with each other along the first axis; and a connection member configured to electrically connect the plurality of battery cells and form a plurality of parallel modules, each of the plurality of parallel modules extending along the second axis, wherein each of the plurality of parallel modules includes:

a first parallel connection connecting a first battery cell at a front position to a second battery cell at a rear position, the first battery cell and the second battery cell being offset from each other along the first axis, and the first battery cell and the second battery cell being in adjacent rows along the second axis;

a second parallel connection connecting a third battery cell at the rear position to a fourth battery cell at the front position, the third battery cell and the fourth battery cell being offset from each other along the first axis, and the third battery cell and the fourth battery cell being in adjacent rows along the second axis;

the first parallel connection and the second parallel connection being oriented in opposing directions relative to the second axis; and a third parallel connection connecting a pair of battery cells of the plurality of battery cells in a same row of the plurality of rows.

2. The battery pack of claim 1, wherein the first parallel connection and the second parallel connection are misaligned with each other, the first and second parallel connections having no parallel portions with respect to each other.

3. The battery pack of claim 1, wherein the first parallel connection is oriented in a direction inclined in a clockwise direction and the second parallel connection is oriented in a direction inclined in a counterclockwise direction opposite to the clockwise direction with respect to the second axis.

4. The battery pack of claim 1, wherein the first parallel connection and the second parallel connection are each formed in a direction inclined at an acute angle with respect to the second axis, the first and second parallel connections being linear connections inclined in opposite directions relative to each other.

5. The battery pack of claim 1, wherein the third parallel connection is parallel to the first axis.

6. The battery pack of claim 1, wherein the pair of battery cells include a front specific cell and a rear specific cell connected by the third parallel connection, the front specific cell and the rear specific cell belonging to a particular row selected from among the plurality of rows.

7. The battery pack of claim 6, wherein each of the front specific cell and the rear specific cell is further connected to the second parallel connection or the first parallel connection.

8. The battery pack of claim 6, wherein, in a row that does not belong to the particular row, a battery cell of the plurality of battery cells is connected by the first and second parallel connections.

9. The battery pack of claim 1, wherein, in the plurality of battery cells, a first position correction cell forms the first parallel connection with each of a preceding row and a subsequent row of the plurality of rows.

10. The battery pack of claim 9, wherein the first position correction cell is arranged between a first, third parallel connection and a second, third parallel connection.

11. The battery pack of claim 1, wherein, in the plurality of battery cells, a second position correction cell forms the second parallel connection with each of a preceding row and a subsequent row of the plurality of rows.

12. The battery pack of claim 11, wherein, the second position correction cell is arranged between a first, third parallel connection and a second, third parallel connection.

13. The battery pack of claim 1, wherein the plurality of parallel modules are adjacent to each other along the first axis, and each of the plurality of parallel modules includes at least two third parallel connections in different rows among the plurality of rows.

14. The battery pack of claim 1, wherein;

the third parallel connection includes a plurality of third parallel connections in each of the plurality of parallel modules, the plurality of parallel modules includes at least a first parallel module and a second parallel module adjacent to the first parallel module along the first axis, and the plurality of third parallel connections in the first parallel module do not overlap the plurality of third parallel connection in the second parallel module along the first axis.

15. The battery pack of claim 1, further comprising a plurality of battery units repeatedly arranged along the first axis, wherein the plurality of parallel modules neighboring each other along the first axis include the third parallel connection along the first axis in rows different from each other.

16. The battery pack of claim 15, wherein each battery unit of the plurality of battery units includes the plurality of parallel modules.

17. The battery pack of claim 16, wherein two parallel modules arbitrarily selected from among the plurality of parallel modules form the third parallel connection in at least one row different from each other.

18. The battery pack of claim 15, wherein a void position that is not filled with any of the plurality of battery cells is at a boundary area between one battery unit and another battery unit among the plurality of battery units along the first axis.

19. The battery pack of claim 1, wherein a number of battery cells in a parallel module of the plurality of parallel modules is greater than a number of rows included in the parallel module.

20. The battery pack of claim 19, wherein a parallel module of the plurality of parallel modules includes:

n-number of battery cells connected in parallel to each other, and m-number of rows, and a number of particular rows forming the third parallel connection in the parallel module is n−m.

* * * * *